(12) United States Patent
West et al.

(10) Patent No.: US 8,509,806 B2
(45) Date of Patent: Aug. 13, 2013

(54) CLASSIFYING THE POSITION OF A WIRELESS DEVICE

(75) Inventors: Earle West, Morganville, NJ (US); Nathan E. West, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/967,747

(22) Filed: Dec. 14, 2010

(65) Prior Publication Data
US 2012/0149388 A1    Jun. 14, 2012

(51) Int. Cl.
*H04W 64/00*    (2009.01)

(52) U.S. Cl.
USPC ...................................... 455/456.1

(58) Field of Classification Search
USPC ............... 342/386, 457, 357.64, 450, 357.25, 342/357.29, 357.31; 455/411, 456.5, 456.2, 455/426.1, 427, 517, 456.1; 370/203, 300, 370/390, 281, 508; 709/224, 230; 706/12
See application file for complete search history.

(56) References Cited

U.S. PATENT DOCUMENTS

| | | | |
|---|---|---|---|
| 5,724,660 A | 3/1998 | Kauser et al. |
| 5,732,354 A | 3/1998 | MacDonald |
| 5,732,383 A | 3/1998 | Foladare et al. |
| 5,982,324 A | 11/1999 | Watters et al. |
| 6,148,219 A | 11/2000 | Engelbrecht et al. |
| 6,256,577 B1 | 7/2001 | Graunke |
| 6,298,233 B1 | 10/2001 | Souissi et al. |
| 6,317,686 B1 | 11/2001 | Ran |
| 6,407,703 B1 | 6/2002 | Minter et al. |
| 6,429,815 B1 | 8/2002 | Soliman |
| 6,453,168 B1 | 9/2002 | McCrady et al. |
| 6,526,335 B1 | 2/2003 | Treyz et al. |
| 6,560,532 B2 | 5/2003 | Cayford |
| 6,594,576 B2 | 7/2003 | Fan et al. |
| 6,690,292 B1 | 2/2004 | Meadows et al. |
| 6,744,383 B1 | 6/2004 | Alfred et al. |
| 6,744,740 B2 | 6/2004 | Chen |

(Continued)

FOREIGN PATENT DOCUMENTS

| EP | 0856746 A2 | 8/1998 |
|---|---|---|
| WO | 2006031035 A1 | 3/2006 |

OTHER PUBLICATIONS

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

(Continued)

*Primary Examiner* — Kiet Doan
(74) *Attorney, Agent, or Firm* — Turocy & Watson, LLP

(57) ABSTRACT

Aspects describe using mobile device telemetry data with location reports from a small fraction of reporting devices to pre-compute a set of categorizing formulas that can quickly assign devices of unknown latitude, longitude, and/or altitude to specific values of latitude, longitude, and/or altitude. The described aspects perform a large percentage of complicated calculations in advance of a particular device of unknown location presenting itself on the radio network. Thus, the categorizing formulas can be applied to categorize the device into a particular range of latitude, longitude, and/or altitude with minimal delays. Various aspects relate to enabling an efficient and highly scalable implementation of mobile device advertising, social networking, and other applications that may reply in rapid, real time delivery of "WITHIN" or NOT WITHIN a "fenced-in" region or geography or shape of space.

18 Claims, 20 Drawing Sheets

(56) References Cited

U.S. PATENT DOCUMENTS

| | | | |
|---|---|---|---|
| 6,801,782 | B2 | 10/2004 | McCrady et al. |
| 6,801,855 | B1 | 10/2004 | Walters et al. |
| 6,816,782 | B1 | 11/2004 | Walters et al. |
| 6,933,100 | B2 | 8/2005 | Igawa et al. |
| 7,098,805 | B2 | 8/2006 | Meadows et al. |
| 7,149,534 | B2 | 12/2006 | Bloebaum et al. |
| 7,277,049 | B2 | 10/2007 | Korneluk et al. |
| 7,289,039 | B2 | 10/2007 | Kato et al. |
| 7,366,492 | B1 | 4/2008 | Ganesh |
| 7,375,649 | B2 | 5/2008 | Gueziec |
| 7,432,829 | B2 | 10/2008 | Poltorak |
| 7,508,321 | B2 | 3/2009 | Gueziec |
| 7,697,917 | B2 | 4/2010 | Camp et al. |
| 7,706,964 | B2 | 4/2010 | Horvitz et al. |
| 7,744,740 | B2 | 6/2010 | Diehl |
| 7,761,225 | B2 | 7/2010 | Vaughn |
| 7,831,380 | B2 | 11/2010 | Chapman et al. |
| 7,848,880 | B2 | 12/2010 | Cheung |
| 7,945,271 | B1 | 5/2011 | Barnes et al. |
| 7,962,162 | B2 | 6/2011 | McNair |
| 7,994,981 | B1* | 8/2011 | Farrokhi et al. ............... 342/386 |
| 8,270,933 | B2 | 9/2012 | Riemer et al. |
| 2001/0047242 | A1 | 11/2001 | Ohta |
| 2003/0097330 | A1 | 5/2003 | Hillmer et al. |
| 2003/0115260 | A1 | 6/2003 | Edge |
| 2003/0222819 | A1* | 12/2003 | Karr et al. ...................... 342/457 |
| 2004/0127191 | A1 | 7/2004 | Matsunaga |
| 2004/0131036 | A1 | 7/2004 | Walsh |
| 2004/0155814 | A1 | 8/2004 | Bascobert |
| 2005/0039056 | A1 | 2/2005 | Bagga et al. |
| 2005/0053099 | A1 | 3/2005 | Spear et al. |
| 2005/0136911 | A1 | 6/2005 | Csapo et al. |
| 2005/0272445 | A1 | 12/2005 | Zellner et al. |
| 2006/0046744 | A1 | 3/2006 | Dublish et al. |
| 2006/0075131 | A1 | 4/2006 | Douglas et al. |
| 2006/0089153 | A1 | 4/2006 | Sheynblat |
| 2006/0282660 | A1 | 12/2006 | Varghese et al. |
| 2007/0217375 | A1 | 9/2007 | Zampiello et al. |
| 2007/0217379 | A1 | 9/2007 | Fujiwara et al. |
| 2008/0004789 | A1 | 1/2008 | Horvitz et al. |
| 2008/0071466 | A1 | 3/2008 | Downs et al. |
| 2008/0076450 | A1 | 3/2008 | Nanda et al. |
| 2008/0096566 | A1 | 4/2008 | Brunner et al. |
| 2008/0133730 | A1 | 6/2008 | Park et al. |
| 2008/0186234 | A1 | 8/2008 | Alles et al. |
| 2008/0274750 | A1 | 11/2008 | Carlson et al. |
| 2009/0024546 | A1* | 1/2009 | Ficcaglia et al. ................ 706/12 |
| 2009/0052330 | A1 | 2/2009 | Matsunaga et al. |
| 2009/0079622 | A1 | 3/2009 | Seshadri et al. |
| 2009/0181695 | A1 | 7/2009 | Wirola et al. |
| 2009/0280828 | A1 | 11/2009 | Wang et al. |
| 2009/0287922 | A1 | 11/2009 | Herwono et al. |
| 2009/0310501 | A1 | 12/2009 | Catovic et al. |
| 2009/0327134 | A1 | 12/2009 | Carlson et al. |
| 2010/0058442 | A1 | 3/2010 | Costa et al. |
| 2010/0100732 | A1 | 4/2010 | Hatakeyama et al. |
| 2010/0203903 | A1 | 8/2010 | Dingler et al. |
| 2010/0207470 | A1 | 8/2010 | Kim et al. |
| 2010/0250542 | A1* | 9/2010 | Fujimaki ....................... 707/737 |
| 2010/0299060 | A1 | 11/2010 | Snavely et al. |
| 2011/0060808 | A1 | 3/2011 | Martin et al. |
| 2011/0077032 | A1 | 3/2011 | Correale et al. |
| 2012/0030083 | A1 | 2/2012 | Newman et al. |
| 2013/0007058 | A1 | 1/2013 | Meredith et al. |

OTHER PUBLICATIONS

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last Accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is At&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

Suykens J.A.K., Vandewalle J., "Least squares support vector machine classifiers", Neural Processing Letters, vol. 9, No. 3, Jun. 1999, pp. 293-300.

M. Ferris, and T. Munson (2002). "Interior-point methods for massive support vector machines". SIAM Journal on Optimization 13: 783-804. doi:10.1137/S1052623400374379.

David Meyer, Friedrich Leisch, and Kurt Hornik. "The support vector machine under test." Neurocomputing 55(1-2): 169-186, 2003.

International Search Report for PCT Application No. US2011/026122 dated Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based- . . . 1&ct=clnk, Oct. 12, 2010.

"Location Based Fraud Detection", Finsphere Corporation, 2008-2010.

Fleishman. Using the Personal Hotspot on your AT & T iPhone. Published online Mar. 15, 2011. http://www.macworld.com/article/158556/2011/03/personal_hotspot_att . . . , 4 pages.

Fleischfresser. Never Stop at a Red-Light Again. Published online Aug. 30, 2011. http://www.smartplanet.com/blog/ . . . , 2 pages.

Cellphone Networks and the Future of Traffic. Published online Mar. 2, 2011. http://m.wired.com/autopia/2011/03/cell-phone-networks-and-the-future- . . . 15 pages.

Intelligent Transportation System. Published online http://en.wikipedia.org/wiki/Intelligent_transportation_system, 7 pages.

Koukoumidis Emmanouil, Peh Li-Shiuan, Martonosi Margaret, SignalGuru: Leveraging Mobile Phones for Collaborative Traffic Signal Schedule Advisory. 14 pages.

Bitcarrier Technology. Published online at http://www.bitcarrier.com/technology. 1 page.

Hao Peng, Ban Xuegang(Jeff). Estimating Vehicle Position in a Queue at Signalized Intersections Using Simple Travel Times from Mobile Sensors. 6 pages.

Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
OA dated Apr. 13, 2012 for U.S. Appl. No. 12/416,853, 36 pages.
Office Action dated Dec. 15, 2011 for U.S. Appl. No. 12/712,424, 34 pages.
Office Action dated Dec. 28, 2011 for U.S. Appl. No. 12/836,471, 34 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 17, 2012 for U.S. Appl. No. 13/220,083, 57 pages.
OA dated Sep. 11, 2012 for U.S. Appl. No. 13/188,345, 44 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.

* cited by examiner

| CELLID PAIR | Reported Tm Difference | AGPS-based distance difference | AGPS Conversion 78.07 m/chip | Derived Mid Tm Difference |
|---|---|---|---|---|
| 10539-to-3449 | 16384 − 26431 = 10,047 chips | 1216 − 1091 = 125 m | 2 chips | 10,045 chips |
| 10539-to-2158 | 16384 − 6821 = 9,563 chips | 1597 − 1216 = 381 m | 5 chips | 9,558 chips |
| 3449-to-2158 | 26431 − 6821 = 19,610 chips | 1597 − 1091 = 506 m | 6 chips | 19,604 chips |

FIG. 5

CLASSIFYING THE POSITION OF A WIRELESS DEVICE

TECHNICAL FIELD

The subject disclosure relates to wireless communications and, more particularly, to location determination of mobile devices in a wireless communications network.

BACKGROUND

In wireless communications networks, there are some mobile devices equipped with Global Positioning Systems (GPS) or other location determination mechanisms that can provide the location information to the communications network. However, there are a large number of mobile devices that do not have location determination mechanisms and/or do not have the means to autonomously provide accurate location information to the communications network.

The mobile service provider's knowledge of the precise location of mobile devices at all times within the communications network can provide valuable benefits to users of the mobile devices as well as opportunities for improved or additional services above and beyond basic connectivity services. Typical communication networks provide access to various communication services (e.g., voice, video, data, messaging, content broadcast, Voice over Internet Protocol (VoIP), and so on) for mobile devices. Further, knowledge of the precise location of the mobile devices within the communication network at all times can allow for location-centric services or information associated with the mobile device to be provided. For example, services such as Emergency 911 (E911) services, mapping services, traffic information services, advertising services, and other services can be provided as a function of the location. Further, mobile device location information can be employed to improve network performance, to troubleshoot networks, to assist local law enforcement, to aggregate valuable demographic information, and an unlimited number of other uses.

Since a large number of mobile devices might not have mechanisms for determining location and/or continuously reporting such information, various solutions have been proposed for determining location information uniformly for all devices at the same time. For example, some techniques include measuring the timing delay of the signals transmitted between a wireless base station and the wireless handset and applying various location services or methods, including, but not limited to, cell global identity and timing advance (CGI+TA), CGI and round trip time (CGI+RTT), time of arrival (TOA), or other custom methods. Such networking timing delays include site timing delay in the wireless signal path among radio component(s) at the wireless base station and a sector antenna. Network timing delays can also include delays that can arise from various mismatches (e.g., impedance mismatch) among electronic elements and components, stray capacitances and inductances, length of the antenna(s) cable(s) in base station(s); tower height of the base station, signal path scattering, or "signal bounces," such as multipath or strong reflections, and the like. Propagation delay between a mobile device and a NodeB is conventionally assumed to be negligible with respect to timing delay. However, depending on the architecture of the serving base station and covered sector antenna(s) signal propagation delay can be substantive, particularly in distributed antenna systems and low-power wireless radio cells and can cause significant error in mobile device location determinations as proposed by traditional techniques.

Other conventional techniques use a small number of GPS-reporting mobile stations to develop fingerprints and/or to solve multiple simultaneous equations as needed to calculate the location of devices that report measurements. For example, some conventional techniques involve solving multiple simultaneous equations at the time of arrival of new timing measurements from mobile devices of unknown location. The time required to solve the equations is lengthy, fundamentally driving up the cost of the many equations that must be solved at a rate equal to the arrival of messages from mobile devices having unknown location.

Some other techniques have attempted to solve the location problem by using a bin-fingerprinting technique. In this technique, the number of bins that must be searched to find a bin that best matches the reported measurements can be time-consuming since the number of bins can be large. This is especially true if the bins must be cubes as might be used to support the calculation of altitude values. Consequently, it would be desirable to have the ability to quickly determine location information of one or more devices in an efficient manner.

Conventionally, various solutions have been proposed for determining location information. However, none of the solutions proposed for determining location information has addressed all of the above requirements and such a solution would be desirable to significantly improve efficiency of determining location information.

The above-described deficiencies of today's location systems and techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

The geographical location of a mobile device in a wireless communications network may be determined by classifying the observed time difference measurements reported by the radio access network into likely ranges of geographic coordinates (e.g., latitude, longitude, and/or altitude). More specifically, a classification system that is trained by the use of historical data of known timing measurements (reported by a relatively small number of mobile devices having known geographical positions e.g., location aware devices) is used to classify the geographic location of a relatively large number of device having unreported geographic locations (e.g., non-location aware devices).

Further, methods and apparatuses are disclosed that compute a set of optimally-classifying hyperplanes in advance of the receipt of timing measurements from mobile devices having an unknown location (using data from mobile devices having precisely known locations). The set of optimally-classifying hyperplanes may be readily applied in order to classify the location of other devices (having unknown geographic location) to a particular range of latitude, longitude, altitude, or other geographic coordinate values.

Various aspects relate to utilizing classification at substantially the same time as AGPS-calibrated timing differences. By calibrating the large number of timing measurement differences with a small number of AGPS measurements, training vectors may be calculated in a region surrounding any given point of interest. When such training data is collected and categorized in advance, all such vectors may be processed to determine "NEAR" or "not NEAR" without the intermediate step of computing latitude, longitude, and altitude for every cell phone location.

Use of "near" and "not near" classifications can efficiently scale to an unlimited number of points of interest and a very large number of mobile device subscribers where calculating the intersection of latitude/longitude of the mobile device with a large numbers of points of interest would be cost-prohibitive and untimely. Conventional techniques involving the polling of user-specific latitude, longitude, and altitude do not efficiently scale to a large number of subscribers and a constant stream of location updates. By combining the provided timing differences with a classifier (e.g., Support Vector Machine) that efficiently determines between "NEAR" and NOT NEAR locations, the solution readily scales to all mobile device users and millions of locations. In addition, the solution equally handles "altitude" as a property of "nearby".

These and other embodiments are described in more detail below.

BRIEF DESCRIPTION OF THE DRAWINGS

Various non-limiting embodiments are further described with reference to the accompanying drawings in which:

FIG. 5 illustrates timing delays of individual base stations transformed to reports of delays associated with specific pairs of base stations, according to an aspect;

DETAILED DESCRIPTION

Figure 1:
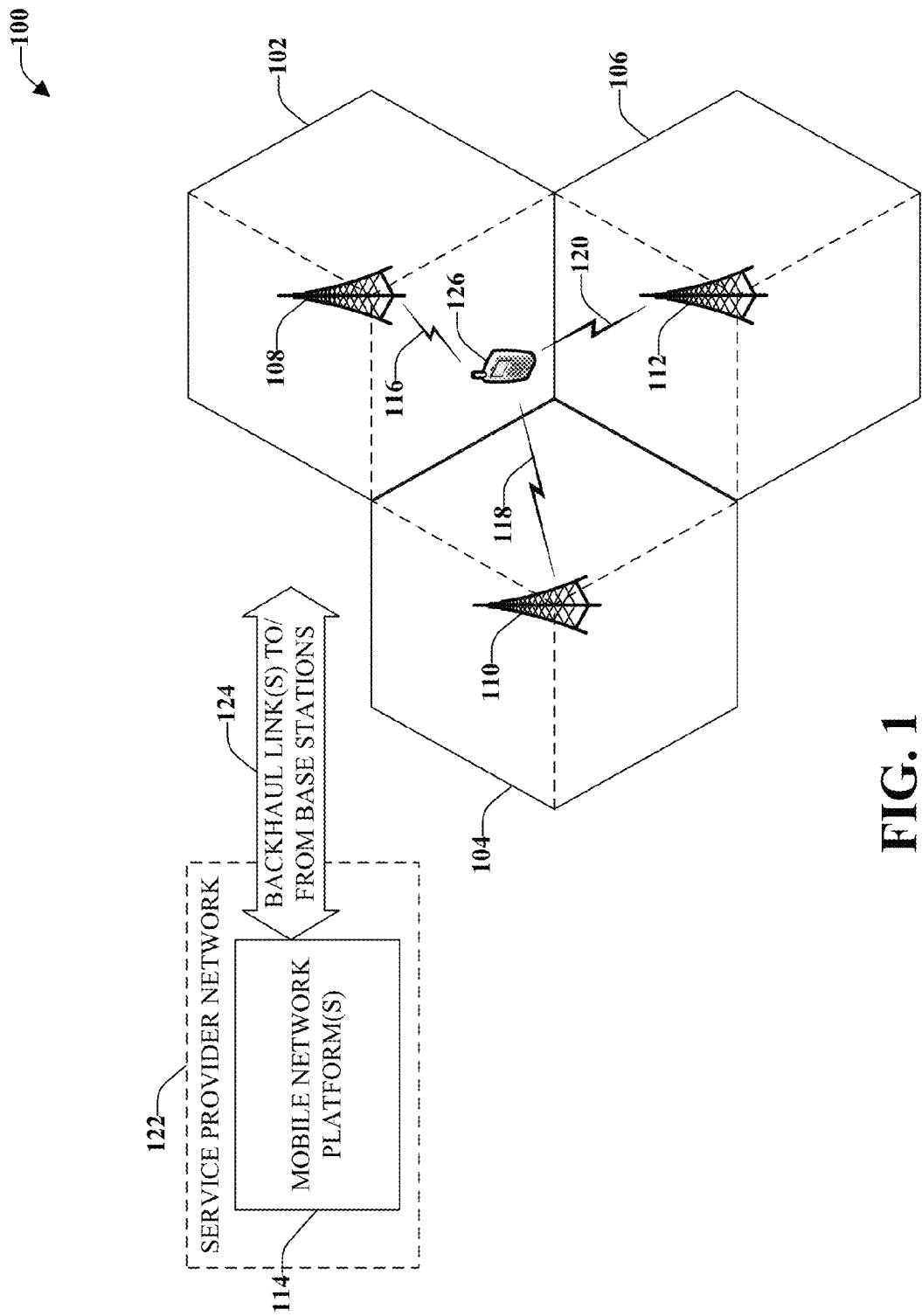
FIG. 1 is a schematic example wireless environment that can operate in accordance with aspects described herein.

Various aspects of the disclosed subject matter are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Determining location information of mobile devices is desirable in order to provide value services and features. It is also desirable to perform such locating in an efficient and accurate manner. Thus, it would be beneficial to combine principles of calculating separating hyperplanes for purposes of classification of multi-dimensional measures with the capacity of a network to provide copies of assisted global positioning system (AGPS) and dedicated channel timing offsets. Through the combination of the three previously uncombined capabilities (e.g., hyperplanes, AGPS, offsets), the accuracy, scalability, and reliability of location based services can be advanced.

The one or more aspects described herein can calculate, in advance, a set of optimally-separating hyperplanes using measurements from mobile devices that report their location. Performing such calculations in advance of the arrival of measurement from mobile devices whose location is unknown can mitigate the overall cost for the same rate of device location calculations. Furthermore, since the disclosed aspects do not explicitly calculate fixed-size geographic bins that are individually searched, the search for a particular latitude, longitude, altitude, or other coordinate value for the mobile device having an unknown location using the one or more disclosed aspects can be faster and can be more precise. A geographic coordinate system, as used herein, is a coordinate system that enables every location on the Earth to be specified by a set of numbers or coordinates. The coordinates are chosen such that two of the numbers represent a horizontal position and one of the numbers represents a vertical position. Generally, the coordinates are latitude, longitude, and altitude (or elevation).

In one embodiment, a computer-readable storage medium comprises computer-executable code instructions stored therein, wherein in response to execution by at least one processor, the computer-executable code performs operations comprising creating at least one classification of values for dimensions of a coordinate of a geographic coordinate system and receiving an array of measurements from a mobile device. The operations also comprise determining a location of the mobile device based on the at least one classification of values and the array of measurements, including determining the coordinate of the geographic coordinate system.

In accordance with some aspects, the receiving comprises receiving at least one of a timing offset for an individual base station, measurements for a pair of base stations, indicator variables, power measurements, or combinations thereof. According to some aspects, the determining comprises individually calculating at least one of a latitude, a longitude, or an altitude of the geographic coordinate system.

Further, various aspects disclosed herein relate to categorizing mobile devices as a function of whether the mobile device is "near" or "not near" a particular point of interest. The point of interest can be a fixed point having a pre-determined latitude, longitude, and altitude and a variable geographical zone of arbitrary shape surrounding such point is provided. Conventionally, such categorization relies on a mutual determination of latitude and longitude of both the point of interest and the mobile device. In contrast, the various aspects disclosed herein can mitigate the need to calculate the latitude and longitude of the mobile device and can more directly classify the mobile device as "near" or "not near" a particular point of interest. In accordance with some aspects, the classification is performed through use of a Support Vector Machine (SVM) at substantially the same time as timing measures, calibrated by AGPS measures for each pair of base stations.

Various aspects related to categorization associated with a point of interest are advantageous because of the ability to scale to a very large number of such points of interest. A further advantage is the ability to handle complex geographic map shapes (as may be needed to follow a certain highway or coast line, for example). Another advantage is the ability to avoid the intermediate step of calculating the geographic coordinates (at any particular degree of resolution) for the mobile device. In addition, the various aspects can readily extend to cover points of interest having a specific altitude and/or range of altitudes, which might be the case in urban canyons or other areas.

By way of further description with respect to one or more non-limiting ways to ascertain location information, FIG. 1 is a schematic example wireless environment 100 that can operate in accordance with aspects described herein. In particular, example wireless environment 100 illustrates a set of wireless network macro cells. Three coverage macro cells 102, 104, and 106 comprise the illustrative wireless environment; however, it should be appreciated that wireless cellular network deployments can encompass any number of macro cells, for example, 104-105 coverage macro cells. Coverage macro cells 102, 104, and 106 are illustrated as hexagons; however, coverage cells can adopt other geometries generally dictated by a deployment configuration or floor plan, geographic areas to be covered, and so on. Each macro cell 102, 104, and 106 is sectorized in a 2π/3 configuration in which each macro cell includes three sectors, demarcated with dashed lines in FIG. 1. It should be appreciated that other sectorizations are possible, and aspects or features of the disclosed subject matter can be exploited regardless of type of sectorization. Macro cells 102, 104, and 106 are served respectively through base stations or NodeBs 108, 110, and 112. Any two NodeBs can be considered a NodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 114, and set of base stations (e.g., Node B 108, 110, and 112) that serve a set of macro cells; electronic circuitry or components associated with the base stations in the set of base stations; a set of respective wireless links (e.g., links 116, 118, and 120) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links 116, 118, and 120 embody a Uu interface (UMTS Air Interface).

Mobile network platform(s) 114 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider 122 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 114 can control and manage base stations 108, 110, and 112 and radio component(s) associated thereof, in disparate macro cells 102, 104, and 106 by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), wireless network platform 114 is embodied in a core network and a set of radio network controllers.

In addition, wireless backhaul link(s) 124 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 124 embodies IuB interface.

It should be appreciated that while exemplary wireless environment 100 is illustrated for macro cells and macro base stations, aspects, features and advantages of the disclosed subject matter can be implemented in microcells, picocells, femto cells, or the like, wherein base stations are embodied in home-based access points.

Timing of wireless signals can take into consideration the time from wave signal generation or output at radio equipment or a transmitter (e.g., a mobile device 126 or a NodeB 108, 110, 112) to detection at a receiver (e.g., a mobile device or a NodeB). Such timing includes site timing through link(s) to antenna(s) and propagation time over the air interface or wireless channel. Timing delay typically is caused by various sources, e.g., mismatches among electronic elements and components (e.g., impedance mismatch), stray capacitances and inductances, length of the antenna(s) cable(s) in base station(s); tower height of base station, whereas timing delay spread generally originates from any signal path scattering, or "signal bounces," such as multipath, strong reflections, etc. and the like. A mobile device observed time difference, 'C', includes both a cell site timing portion, 'A', and a RF propagation portion, 'B', such that A+B=C. Further, where cell site location and mobile device location are known, the RF propagation time, B, can be deduced, e.g., B=(distance between mobile device and cell site/speed of light). Using the deduced RF propagation time, B, and observed mobile device time difference, C, the cell site timing, A, can be calculated, as A=C−B. Site timing, A, is relatively stable over periods of hours to days for most modern network equipment. Once A is determined, C can be measured for additional mobile devices and the RF propagation time (i.e., B) for theses additional mobile devices can be determined by B=C−A. RF propagation time, B, can then be converted into a distance (e.g., B*speed of light=distance) and, using one or more of the disclosed aspects, mobile devices' positions can be identified.

Determining the values of B by geometry can be facilitated by having knowledge of the location of the NodeB and the mobile device. NodeB locations are typically known with high levels of precision, as these are normally permanent installations. Further, the location of a particular mobile device can be determined using internal GPS systems (e.g., AGPS, usually to within 5-10 meter accuracy). Thus, an AGPS enabled mobile device can facilitate the determination of A, as disclosed herein, such that the location of non-location aware mobile devices in a macro cell can be calculated, for example, by using the determination of A to create classifying hyperplanes in advance of receiving timing measurements from the non-location aware mobile devices.

Figure 2:
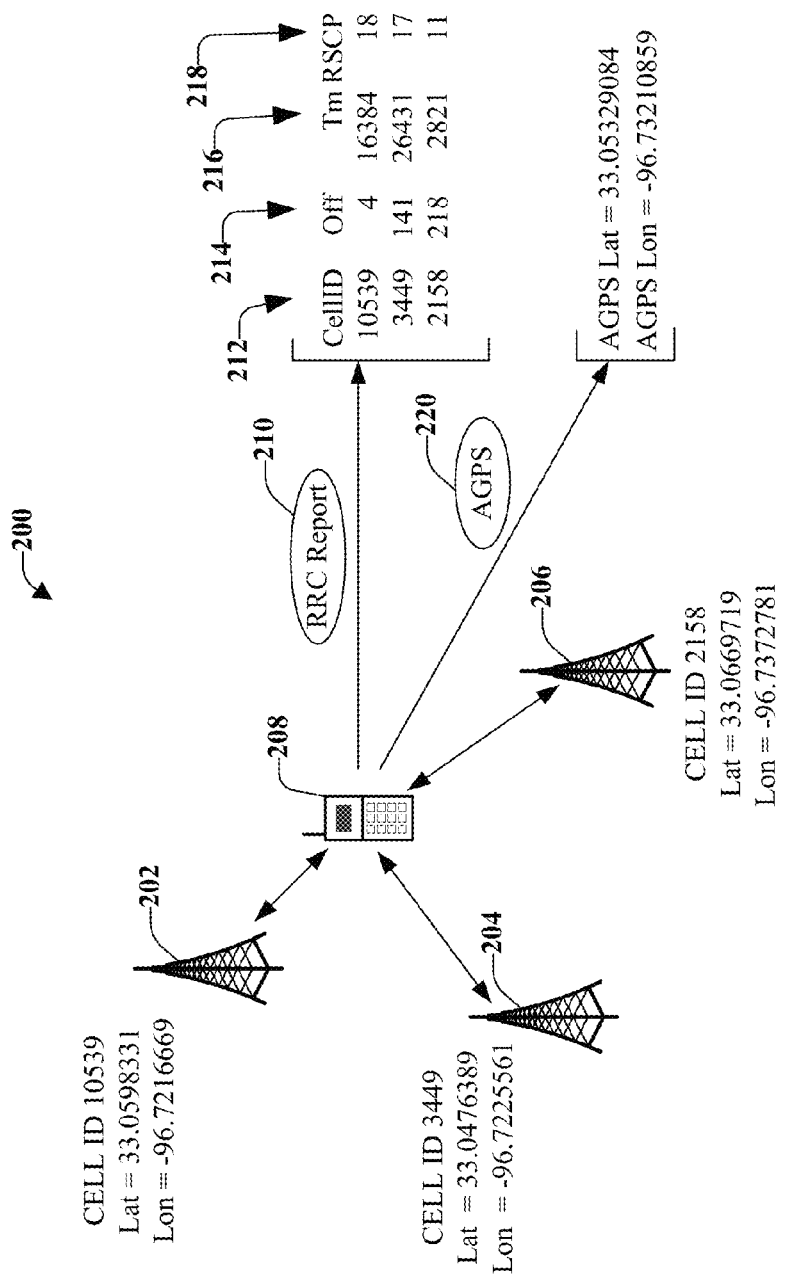
FIG. 2 is a diagram of an exemplary wireless communication network, according to an aspect.

By way of further description with respect to one or more non-limiting ways to ascertain location information for non-location aware mobile devices, a diagram of an exemplary wireless communication network 200 is illustrated generally by FIG. 2. Wireless network types can include Universal Mobile Telecommunications Systems (UMTS), Long Term Evolution (LTE), High Speed Packet Access (HSPA), Code Division Multiple Access (CDMA), Multi-Carrier Code Division Multiple Access (MC-CDMA), Single-Carrier Code Division Multiple Access (SC-CDMA), Time Division Multiple Access (TDMA), Frequency Division Multiple Access (FDMA), Single-Carrier FDMA (SC-FDMA), Orthogonal Frequency Division Multiple Access (OFDMA), and so on.

Communication network 200 can include a first base station 202, a second base station 204, and a third base station 206. Each base station can be associated with a cell identifier (CellID) and can have a known geographic position. For example, the first base station 202 is associated with CellID 10539 and is at 33.0598331 degrees latitude (Lat) and −96.7216669 degrees longitude (Lon). The second base station 204 is associated with CellID 3449 and is at 33.0476389 degrees latitude and −96.7225561 degrees longitude. Further, the third base station 206 is associated with CellID 2158 and is at 33.0669719 degrees latitude and −96.7372781 degrees longitude. As stated previously, the installation of NodeBs are generally permanent and, therefore, the location of the base stations generally does not change.

Also included in communication network 200 is a mobile device 208 that can receive signals from (or send signals to) the first base station 202, the second base station 204, and/or the third base station 206. In an example, when the mobile device 208 receives a signal from the first base station 202, the signal includes CellID 10539, which identifies the base station. It should be understood that communication network 200 could include a multitude of base stations that communicate with a multitude of mobile devices. However, only three base stations and a single mobile device are illustrated and described herein for purposes of simplicity.

The mobile device 208 can be configured to provide to communication network 200 (e.g., one or more base stations 202, 204, 206) a Radio Resource Control (RRC) report 210 that includes measurements performed by the mobile device 208. In accordance with some aspects, the mobile device 208 transmits the RRC report 210 periodically, continuously, randomly, variably or based on a different time interval, criteria, and/or occurrence of an event.

According to some embodiments, each of the mobile devices included in communication network 200 provide respective RRC reports (e.g., under 3GPP standards). However, the disclosed aspects are not so limited and there might be situations where only a subset of mobile devices provide respective RRC reports. Further, although the term RRC report is utilized herein, it should be understood that other types of reports or measurements can be provided by mobile devices and the disclosed aspects are not limited to RRC reports.

The RRC report 210 (or other report) can provide information related to Timing Offsets Measurements (Tm) for each base station. For example, the RRC report 210 provided by the mobile device 208 includes the CellID 212 of each base station being reported, a timing offset (Off) 214, a timing measurement Tm 216, and a received signal code power (RSCP) 218. It should be noted that other information might also be included in the RRC report 210 (or other report), however, only the information noted is discussed herein for purposes of describing the one or more disclosed aspects.

As discussed some mobile devices are location aware and, therefore, are capable of ascertaining and providing location information, which can include latitude, longitude, and altitude. Other mobile devices are non-location aware and, therefore, might not be capable of ascertaining and providing location information. As shown in FIG. 2, mobile device 208 provides its assisted global positioning system (AGPS) location 220 of 33.05329084 degrees latitude and −96.73210859 degrees longitude. Although not illustrated, the mobile device 208 might also reports its altitude. When a location aware mobile device provides its location, that location can be utilized at substantially the same time as at least a portion of the information included in the RRC report to create and/or update a location model, which is utilized later for classification and location determination of a non-location aware mobile device.

Figure 3:
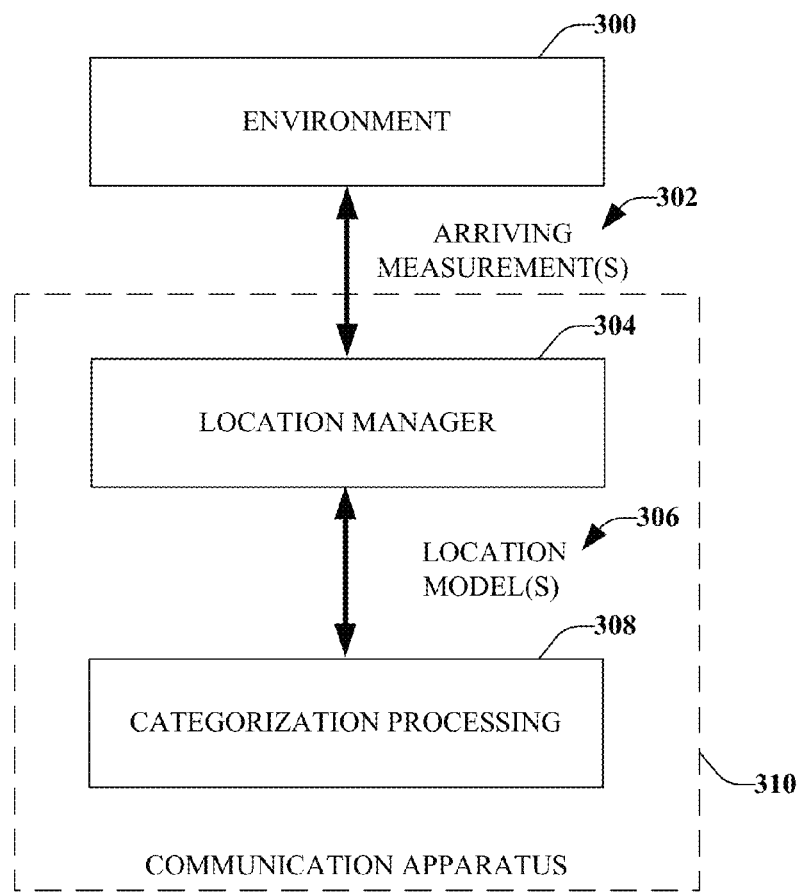
FIG. 3 is a block diagram of an exemplary communication system, according to an aspect.

A block diagram of an exemplary communication system is illustrated generally by FIG. 3. The communication system includes an environment 300, which can be a communications network. Various parameters measured by one or more mobile devices within the environment 300 are provided in the form of one or more arriving measurements 302. A location manager component 304 intercepts the arriving measurements 302 from the environment 300 and processes respective locations of devices based on the arriving measurements 302 to generate, update, and/or obtain one or more hyperplanes or location models 306. The one or more location models 330 can be subsequently provided to a categorization processing component 340 for location determination of a non-location aware mobile device.

As shown, location manager component 304 and categorization processing component 308 can be included in a communication apparatus 310. The communication apparatus 310 can employ a classification scheme, as opposed to a search scheme, to classify a combined set of measurements, wherein each measurement is classified with respect to the range of latitude, longitude, and/or altitude the measurement should be in based on the classification scheme.

The location manager component 304 can be configured to organize and store measurements from the external environment 300 (which includes RRC measurement reports from individual devices), wherein the measurements are aligned and organized for use by the categorization processing component 308. In accordance with some aspects, some of the historical measurements (e.g., reports) have corresponding AGPS measurements available while other historical measurements do not have corresponding AGPS measurements. The location manager component 304 is configured to recognize the difference between historical measurements with AGPS measurements and without AGPS measurements. In accordance with some aspects, the location manager component 304 is configured to use and reference the reports that include AGPS (which by their nature are self-classified as to their geographic coordinates), to create and update a classification model, which can be provided to the categorization processing component 308. The categorization processing component 308 can utilize the available location models and assign a geographic coordinate (e.g., latitude, longitude, altitude) category to all devices, including those devices lacking AGPS assignments. The assignment is performed consistent with the operation of the categorization processing component 308.

The classification scheme can be readily derived by computing a hyperplane in the space containing vectors of measurements. These vectors may be readily assembled by concatenating reported measurements and other facts known about the mobile devices at the time each mobile device reports its measurements.

For instance, location manager component 304 can be configured to evaluate the one or more arriving measurements 302 and, if location information is included with the arriving measurements 302, location manager component 304 develops a set of training vectors and classifications of where devices are historically located. Based on the training vectors and historical locations, location manager component 304 can create a hyperplane that divides a geographical location. The hyperplanes can be retained as one or more location models. The hyperplanes can later be used by categorization processing component 308 to ascertain a location (which can include latitude, longitude, and altitude) of a non-location aware mobile device. Each type of location or geographic coordinate (e.g., latitude, longitude, altitude) can be calculated separately in accordance with an aspect.

If the arriving measurements 302 do not include location information (e.g., received from a non-location aware device), location manager component 304 can be configured to access a database that includes previously created hyperplanes or location models. Based on the hyperplanes, categorization processing component 308 evaluates measurements received from a non-location aware device and determines the location (e.g., latitude, longitude, and/or altitude) of the non-location aware device. In accordance with some aspects, the location information can be communicated to the non-location aware device. According to some aspects, the location information is used by the network services provider to provide services and/or to optimize the operation and performance of the network itself.

In accordance with some aspects, the location manager component 304 is configured to receive at least one measurement from a location aware mobile device and create a location model. According to an example, the location manager component 304 is further configured to determine at least one classification of values for one or more dimensions of latitude, longitude, and/or altitude using an array of measurements reported by the location aware mobile device.

The categorization processing component 308 is configured to utilize the location model to determine a location of a non-location aware mobile device. In another example, the categorization processing component 308 is further configured to utilize the at least one classification of values to determine the location of the non-location aware mobile device. Additionally or alternatively, the categorization processing component 308 is further configured to receive the at least one measurement from the non-location aware mobile device and classify the at least one measurement in a sequence of classification operations that provide upper and lower bounds for at least one of a latitude, a longitude, and an altitude.

In accordance with some aspects, the categorization processing component 308 is further configured to utilize one or more kernel functions that map a vector of measurements provided by the non-location aware mobile device to a set of measurements in a higher dimension. Additionally or alternatively, the categorization processing component 308 is further configured to individually evaluate a latitude, a longitude, and/or an altitude to determine the location of the non-location aware mobile device.

Figure 4:
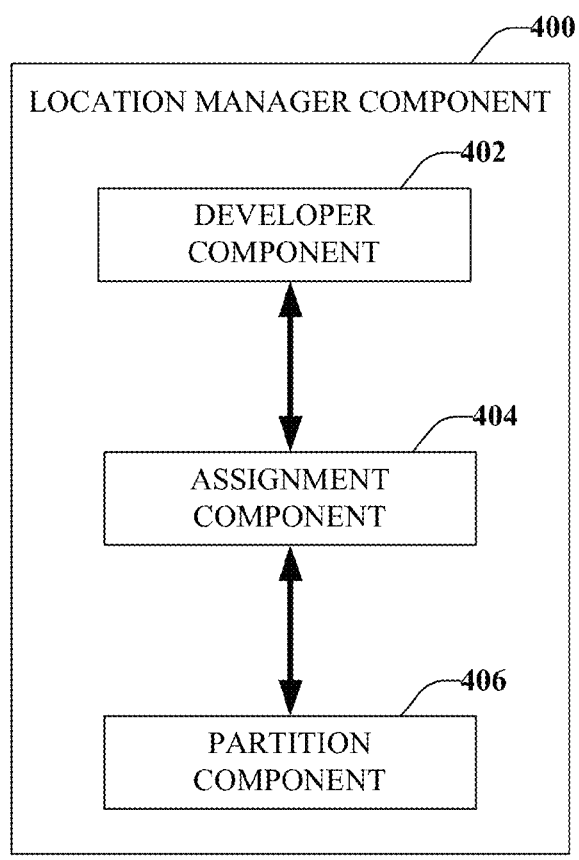
FIG. 4 is a block diagram showing a location manager component, according to an aspect.

Illustrating other aspects, FIG. 4 is a block diagram showing a location manager component 400 containing a developer component 402, an assignment component 404, and a partition component 406. Location manger component 400 is configured to evaluate locations with reference to timing measurements as reported by location aware devices located within a communications environment. The measurement reports (e.g., RRC Report 210 of FIG. 2) can include identification of base stations (CellID) and measurements related to the base stations, which can include timing measurements for the individual base stations.

In one embodiment, upon receiving the one or more arriving measurements that include location data, the developer component 402 is configured to produce a set of training vectors. To create the set of training vectors, the developer component 402 can take into account historical measurements as well as the newly received location data and arriving measurements. In accordance with some aspects, developer component 402 can be configured to determine timing offsets for each pair of base stations. For example, if there are two base stations, developer component 402 can evaluate the pair and determine the timing offset for the pair. In another example, if there are three base stations (A, B, and C), developer component 402 can evaluate three pairs (A-B, B-C, and A-C) and determine the timing offset for each of the three pairs, and so forth.

In an example, developer component 402 calculates training vectors above and below a given value of latitude, longitude, and/or altitude. For this example, three training vectors have known classifications. A first training vector is at 32.0 degrees latitude (lower test point), a second training vector is at 34.0 degrees latitude (upper test point), and a third training vector is at 33.0 degrees latitude (latitude of interest).

System performance can be enhanced with respect to calculation speed and memory by augmenting the three vectors by increasing the number of dimensions in the hyperplane problem to include dimensions corresponding to certain indicator variables that are Boolean values indicating which pair of mobile base stations is relevant to the solution. For example, the three vectors can be supplemented with Boolean values (1 or 0) corresponding to which base station pair is part of the measurement set and/or which base station pair is not part of the measurement set. An example of supplemented vectors can be:

(1,1,1,0,0,0,0,0,2,5,7)→classification=−1 where 1,1,1,0,0,0,0,0 are indicator values for pairs of CellIDs in the report and 2,5,7 are the geographical position difference values for specific pairs of Cell IDs.

Other examples of supplemented vectors are:

(1,1,1,0,0,0,0,0,3,5,6)→classification=+1 and (1,1,1,0,0,0,0,0,2,5,6)→classification=0

The assignment component 404 is configured to organize the device locations as it relates to latitude, longitude, and/or altitude for each measurement. For example, since the mobile device also reported its location information, for each pair, a reference offset difference and an expected geographic distance to each CellID in the pair is determined by assignment component 404.

The partition component 406 uses the set of training vectors and device locations to create a hyperplane to divide the geographic area of interest. For example, developer component 402 is configured to calculate timing differences between available pairs of cells or base stations. A mobile device (such as mobile device 208 of FIG. 2) conveys a measurement report and position information, wherein the measurement report (e.g., RRC report 210 of FIG. 2) can include reports of timing delays associated with individual base stations. As shown in FIG. 5, the timing delays of the individual base stations may be transformed to reports of delays associated with specific pairs of base stations (not the individual base stations), shown as CellID Pair 502. For each CellID Pair 502, a reported time measurement (Tm) difference 504 can be calculated and can be expressed in terms of chips, which is a unit of measurement resolution, which are approximately 78 meter units. According to some aspects that utilize 3GPP technology, there is an enabling theory in which the differences, represented as chips contain fixed components and variable components. The variable component is the propagation delay. The reported Tm difference 504 can be calculated by subtracting the reported Tm for each base station of the pair.

For mobile stations whose location is also known (typically by the time-coincident report of GPS measurements), an AGPS-based distance difference 506 can also be calculated. The AGPS-based distance difference 506 demonstrates how actual distances to each of the respective base stations may be subtracted out of the reported difference measurements to achieve a reference figure for each pair of base stations.

As shown at, 508, the reference calculation can be summarized in terms of meters or, in accordance with some aspects, can be expressed in terms of the unit of measurement resolution (chips). It should be noted that since the actual geographic difference in distance to each of the respective base stations have been subtracted out of this value, this reference value may be subsequently used to remove any static difference owing to cell site synchronization difference. Further, this reference value is the difference expected in the event that the mobile device reporting the measurements were exactly midway between the base stations (e.g., pairs). As a practical matter, this value is invariant over a long period of time (e.g., hours), making it suitable for use in calculations for many mobile devices that do not report location information.

Figure 6:
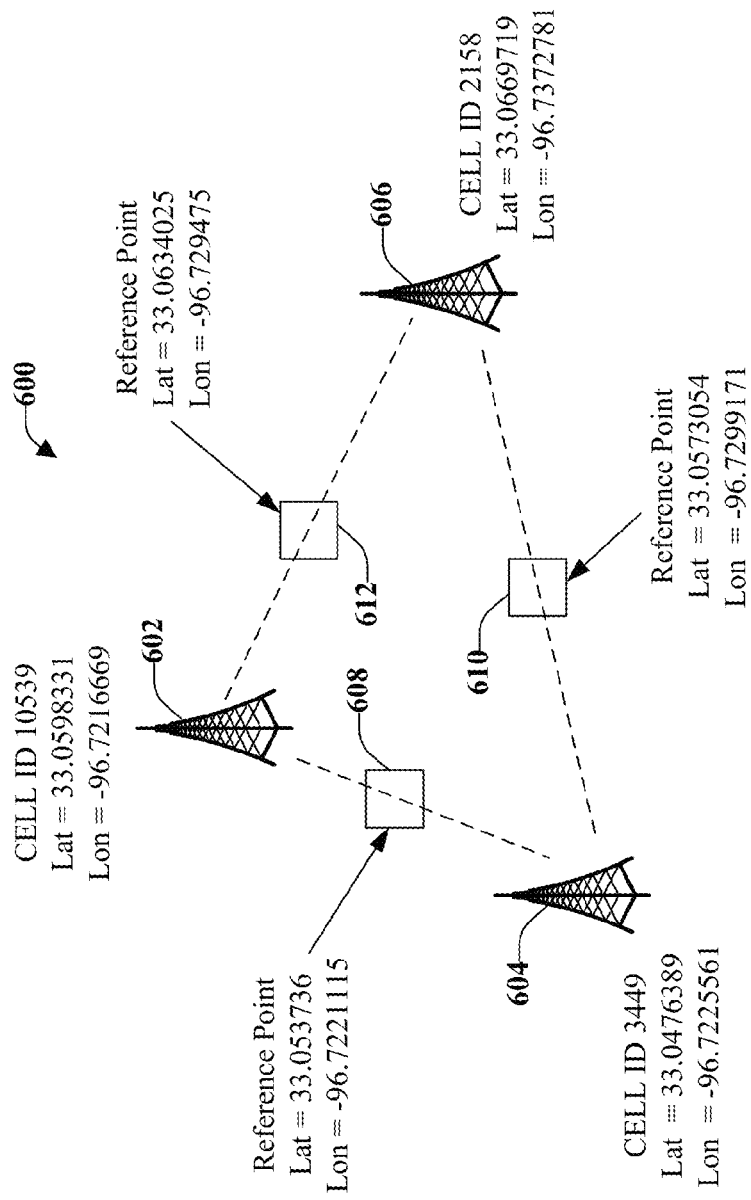
FIG. 6 is an exemplary communication system that utilizes measurements for multiple assisted global positioning system reporting mobile devices, according to an aspect.

To further describe the functionality of location manager component, FIG. 6 is an exemplary communication system that utilizes measurements for multiple AGPS-reporting mobile devices to statistically combine observed Tm differences, according to an aspect. Communication system comprises a first base station 602, a second base station 604, and a third base station 606. Each base station has a known geographic location.

In some situations, there might be multiple mobile devices of possible different make and model that all report similar measurements for the same set of base stations (e.g., pairs) and these values result in different reference values. For example, there are two mobile devices (identified by respective IMSI numbers) that provide measurements related to first base station 602/second base station 604 pair. The following reported measurements results in a median Tm value of 10047 and a reference point 608 having a location of 33.053736 degrees latitude and −96.7221115 degrees longitude:

Cell-Pair 10539-3449:
18:01:58 imsi= . . . 4684; avg_rscp=17.5; 934m; 10045
22:44:40 imsi= . . . 2359; avg_rscp=20.5; 954m; 10048

In another example, there are three mobile devices that report information related to second base station 604/third base station 606 pair, as provided below, which results in a median Tm value of 19600 and a reference point 610 at 33.0573054 degrees latitude and −96.7299171 degrees longitude:

Cell-Pair 3449-2158:
18:01:58 imsi= . . . 4684; avg_rscp=14; 491m; 19604
22:44:40 imsi= . . . 2359; avg_rscp=15; 827m; 19600
23:26:17 imsi= . . . 5919; avg_rscp=2.5; 1041m; 18756

In a further example, a median Tm value of 9552 and a reference point 612 located at 33.0634025 degrees latitude and −96.7294725 longitude are derived from measurement reports related to third base station 606/first base station 602 pair as received from five different mobile devices. The measurement reports are as follows:

Cell-Pair 10539-2158:
18:01:58 imsi= . . . 4684; avg_rscp=14.5; 1152m; 9558
18:04:38 imsi= . . . 9772; avg_rscp=32; 606m; 9552
22:26:01 imsi= . . . 5618; avg_rscp=11.5; 1627m; 9539
22:44:40 imsi= . . . 2359; avg_rscp=16.5; 1505m; 9552
23:28:23 imsi= . . . 3932; avg_rscp=21.5; 972m; 288843

Location manager component calculates the median values, which are retained as the reference value for the respective pairs of base stations. This process can mitigate errors associated with relying on a single mobile device that may be used to calculate reference values that are then used to determine the location of many other mobile devices having an unknown location.

Figure 7:
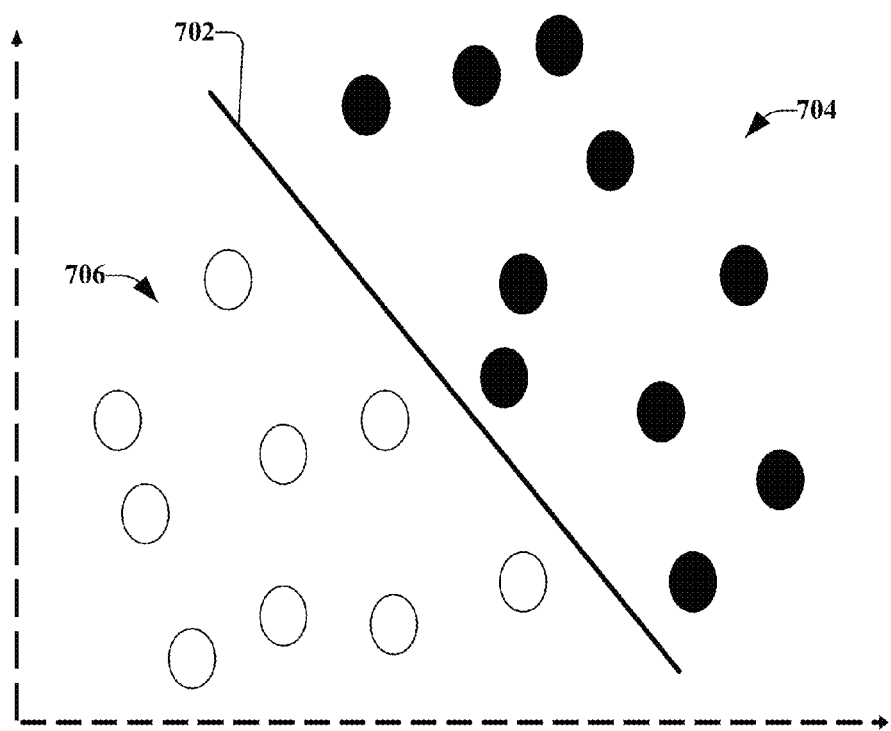
FIG. 7 illustrates a schematic representation of liner separating hyperplanes, according to an aspect.

In order to fully appreciate the disclosed aspects, FIG. 7 illustrates a schematic representation of liner separating hyperplanes. The circles represent mobile devices within a communication environment. A hyperplane 702 is shown separating a first set of devices, shown generally at 704, and a second set of devices, shown generally at 706. The hyperplane can be represented by the equation $w \times x + b = 0$, wherein the first set of devices 704 can be represented by the equation $w \times x + b > 0$, and the second set of devices 706 can be represented by the equation $w \times x + b < 0$. Since the hyperplane 702 illustrated as a straight line separating the sets of mobile devices; and the equation of a straight line is $y = mx + b$, the first set of mobile devices 704 all have a value for the equation $f(x, y) = (y - mx - b)$ greater than zero and the second set of mobile devices 706 all have a value for the same equation that is less than zero. Further details related to creating the hyperplanes will be provided below.

In accordance with some aspects, separating hyperplanes can include creating a list of values of latitude (or other geographic coordinate) that divides a field of interest into many ranges of latitude values, which need not be regular. For each given value of latitude, a set of two or more training points (and possibly base station timing differences) incrementally above and below the given value of latitude are identified. Using the training points with their timing differences (one difference measurement for each base station) as "training vectors", a separating hyperplane is calculated. The separating hyperplane can be a formula that is a function of all of the timing measurement differences for all pairs of base stations in the field of interest. The formula can produce a result that is a positive number for timing differences associated with values of latitude above the specified value, and a negative number for timing values below the specified value. The coefficients of the separating hyperplane can be saved in a database as a property of the selected value of latitude. A similar process can be performed for other geographic coordinates.

To use the separating hyperplane to determine locations of devices of unknown location, the following example is provided. First, a bounding box within which the device is expected to be, based on the base stations identified in the measurement report, is determined. The separating hyperplane coefficients for a particular "middle" value of latitude within the bounding box is retrieved. The hyperplane coefficients are applied to the measured timing differences provided by the reporting device of unknown location. Based on the positive and/or negative value of the separating hyperplane, a determination is made as to which region of latitude the device is located. The process continues with retrieving the separating hyperplane coefficients, applying the hyperplane coefficients, and so forth, until no further hyperplanes are defined in the database for the region of interest.

Figure 8:
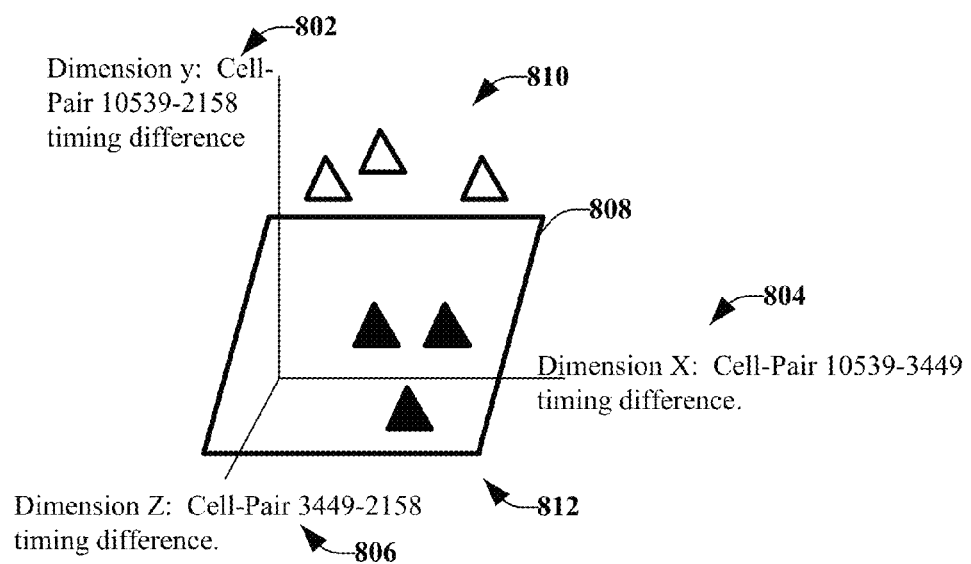
FIG. 8 illustrates another example of a separating hyperplane model, according to an aspect.

FIG. 8 illustrates another example of a separating hyperplane model, according to an aspect. In this figure, the example is for a latitude of 33.0 degrees. However, it should be noted that a plurality of hyperplanes are calculated, wherein each hyperplane relates to a single latitude, longitude, and/or altitude of interest. The hyperplane(s) can be calculated using data derived from location aware devices and the hyperplane(s) are used to categorize non-location aware devices.

For a particular mobile device that reports measurements to three pairs of base stations, FIG. 8 shows three dimensions 802, 804, and 806 of the optimization problem. For any particular degree of latitude (33.0 degrees is shown in the figure), a hyperplane 808 may be determined that optimally separates mobile devices reporting measurements such that there are devices (represented as triangles) located both above (810) and other devices (represented as solid triangles) below (812) the hyperplane. These measurements correspond to devices having a geographic location whose latitude is known to be above or below the value 33.0 degrees. For example, the three devices above 810 the hyperplane have a latitude that is greater than 33.0 degrees and the three devices below 812 the hyperplane have a latitude that is smaller than 33.0 degrees.

The hyperplane itself can be computed as the solution of a least squares optimization problem that positions the hyperplane optimally between points that are closest to the hyperplane boundary. The 3-tuple measurements that are used to calculate the hyperplane can be those points associated with mobile stations whose location is precisely known (e.g., based on a GPS measurement). By extension, the same set of hyperplanes can be utilized to classify non-location aware mobile devices to a particular range of latitude, longitude, and/or altitude values.

Figure 9:
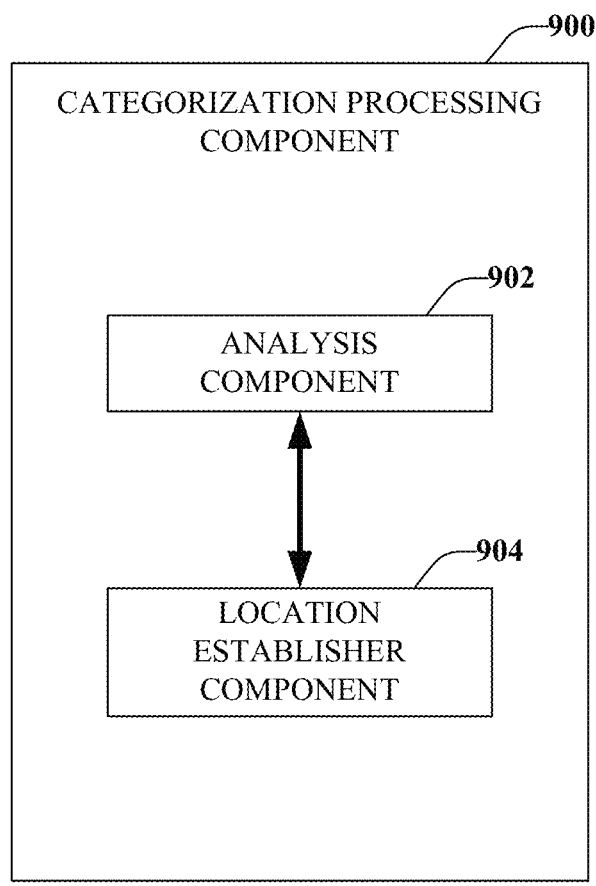
FIG. 9 is a block diagram showing a categorization processing component, according to an aspect.

Illustrating other aspects, FIG. 9 is a block diagram showing a categorization processing component 900 containing an analysis component 902 and a location establisher component 904. In one embodiment, categorization processing component 900 receives an indication of a reported time measurement from a mobile device. In accordance with some aspects, the indication of the reported time measurement report does not arrive with location information. However, in accordance with some aspects, the time measurement report is received with location information and categorization processing component 900 performs an evaluation to determine the accuracy of a location model as developed by a location manager component.

Based on the received time measurements, the analysis component 902 is configured to obtain a set of hyperplanes computed by a location manager component, for example. The time measurements are applied to the hyperplanes by analysis component 902. Location establisher component 904 is configured to determine a location of the mobile device. For example, the hyperplane can have coefficients, such as the following where S1 through S10 are SVM model coefficients:

$S1*1+$ $S2*1+$ $S3*1+$ $S4*0+$ $S5*0+$ $S6*0+$ $S7*0+$ $S8*2+$ $S9*5+$ $S10*6$

The coefficients of the hyperplane separates measurements having these dimensions and can be applied by location establisher component 904 to classify any set of similar measurements as to whether the measurements are from a mobile device that is located above, below, or right at 33.0 degree latitude value. An example of classification of a SVM training vector identified as (1,1,1,0,0,0,0,0,2,5,6) can take the following format:

Classification of (1,1,1,0,0,0,0,0,2,5,6)=

If =0 then lat=33.0

If >0 then lat>33.0

If <0 then lat<33.0

In accordance with some aspects, the calculation of a specific solution to finding optimal hyperplanes, including the selection and use of kernel functions is well known and readily undertaken by individuals skilled in the art of using support vector machines (SVMs).

Figure 10:
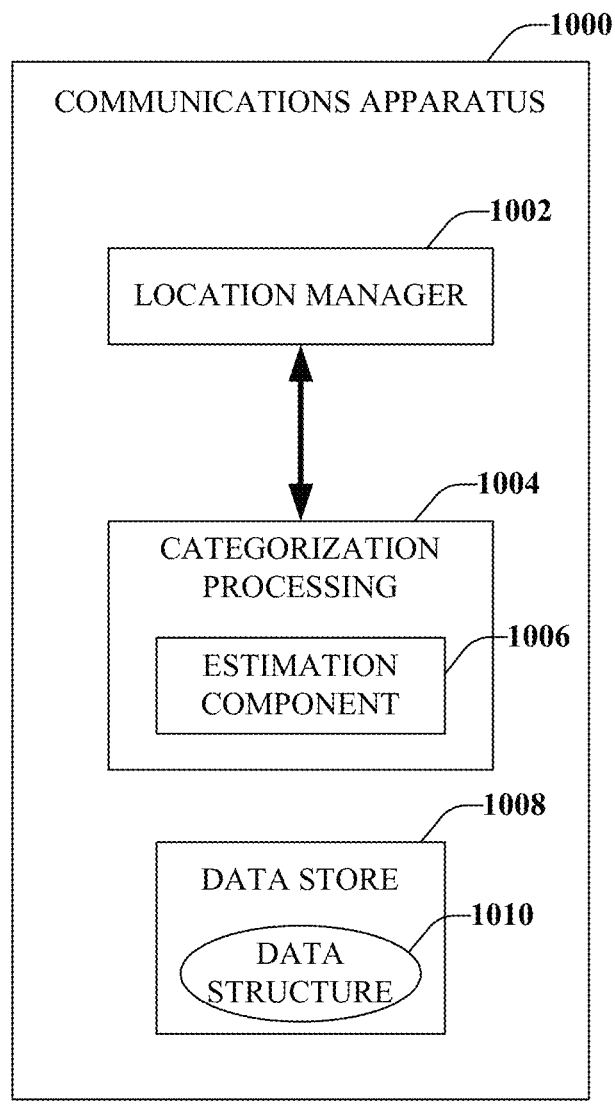
FIG. 10 illustrates a wireless communications apparatus configured to categorize mobile devices as a function of a point of interest, according to an aspect.

FIG. 10 illustrates a wireless communications apparatus 1000 configured to categorize mobile devices as a function of a point of interest, according to an aspect. According to this aspect, wireless communications apparatus 1000 can render a determination of whether a given mobile device is "near" or "not near" a particular point of interest or area of interest. The point of interest can have a fixed point that comprises a pre-determined latitude, longitude, altitude, or other geographic coordinate. The point of interest can also have a variable geographical zone that can have an arbitrary shape surrounding the point of interest. In accordance with some aspects, the "near" or "not near" determination can enable targeted based advertising, social networking, and/or other application that can utilize real-time information. For example, various aspects relate to enabling an efficient and highly scalable implementation of mobile device advertising, social networking, and other applications that may reply in rapid, real time delivery of "WITHIN" or "NOT WITHIN" a "fenced-in" region or geography or shape of space (e.g., boundary).

In order to categorize one or more mobile devices as a function of the point of interest, wireless communications apparatus comprises a location manager component 1002 and a categorization processing component 1004. Location manager component 1002 is configured to receive measurement reports from a multitude of mobile devices. In accordance with some aspects, at least some of the measurement reports are received with AGPS information, while other measurement reports do not have corresponding AGPS information. Based on the various measurement reports received, location manager component 1002 is configured to create a model as to whether a particular mobile device is located within a point of interest boundary or whether the mobile device is located outside the point of interest boundary.

Figure 11:
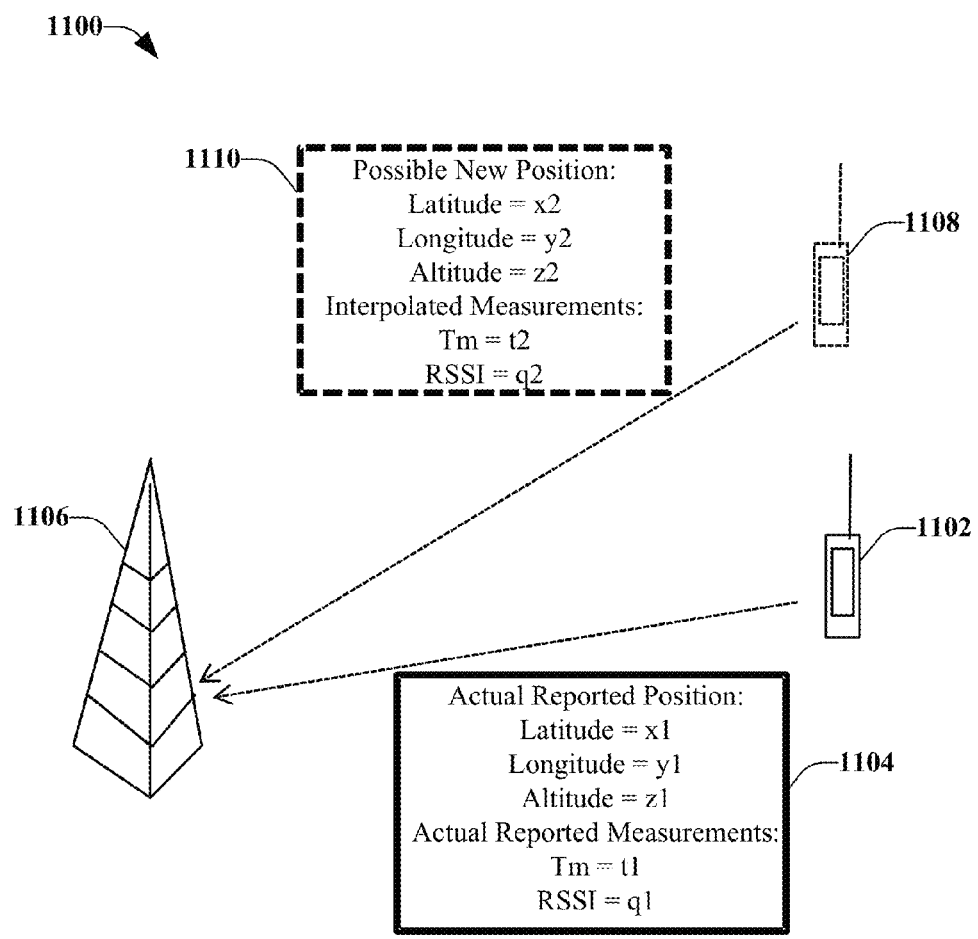
FIG. 11 illustrates a schematic representation of an environment in which a communications apparatus can operate to provide categorization of devices according to a region of interest, according to an aspect.

Based, at least in part, on the model created by location manager component 1002, the categorization processing component 1004 can determine whether or not a particular mobile device is "near" or "not near" a point of interest. For example, FIG. 11 illustrates a schematic representation of an environment 1100 in which communications apparatus 1000 can operate to provide categorization of devices according to a region of interest, according to an aspect. The region of interest can be arbitrarily defined (e.g., similar to gerrymandered congressional districts) and devices can be categorized as to whether they are in the region or not in the region. Similar to the manner in which geographic coordinates (e.g., latitude, longitude, altitude) may be categorically determined, categorization processing component 1004 can include an estimation component 1006 that can be configured to categorically determine if a device is near a particular point of interest and/or in some defined geographical area (regardless of whether latitude, longitude, and/or altitude is calculated).

In accordance with an aspect, estimation component 1006 can advantageously categorically determine whether a device is in any such (very large number) of regions or points, each of which may be arbitrarily large or small and having any shape, including having holes and/or non-contiguous geographical regions included. In accordance with some aspects, categorization processing component 1004 can determine which devices are above, below, or within a particular altitude.

As illustrated, a mobile device 1102 can, at substantially the same time, provide measurements of both its location and various other telemetry data 1104. The telemetry data 1104 can include timing offset and power measurements, which can be Tm and RSSI (Received Signal Strength Indication), as an example, which can have properties that vary with distance from a base station 1106.

An increase in distance separating base station 1106 and mobile device 1002 can have a specific effect on measurements 1104 provided at any given point in time. As an example, the timing offset value might shift to a higher number in proportion to increased distance of separation (plus some unknown fixed value). Alternatively, the power measurement RSSI might decrease in proportion to a change in the same change in distance between the base station 1106 and the mobile device 1102.

Given the expected and known degree by which these measurements 1104 from the mobile device 1102 change with the distance of separation between the cell tower 1106 and the mobile device 1102, estimation component 1006 can perform an interpolation to determine what those measurements might theoretically be if the mobile device were moved to a new position 1108. For the theoretical position 1108, a measurement data structure 1110 can be tabulated for various points within a geographic boundary where mobile device is able to report measurements to base station 1106.

Figure 12:
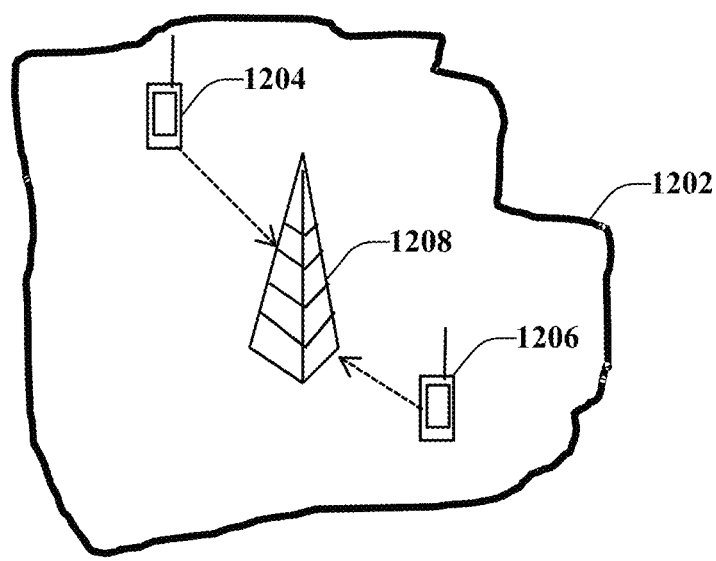
FIG. 12 illustrates an example representation of a region of interest, according to an aspect.

FIG. 12 illustrates an example representation of a region of interest, according to an aspect. The region of interest comprises a boundary 1202 that can be arbitrarily defined and/or can have precise geographical coordinates. As shown, a multitude of mobile devices, shown as first device 1204 and second device 1206, can be reporting actual measurements to a base station 1208.

The measurement reports may occur at various times and can be utilized to augment the precision of expected theoretical measurements for points within the boundary 1202 within reach (e.g., communication range) of base station 1208. Estimation component 1006 can be configured to compute the median, mean, or some other statistical function of the expected measurement derived from two or more mobile devices that are reporting actual measurements. In accordance with some aspects, the theoretically expected set of measurements for any point within the region or boundary 1202 may be interpolated in advance of the use of such data structures. Furthermore, as time passes, estimation component 1006 can be configured to statistically forecast any regular time-of-day and/or regular seasonal variations in such expected values.

Figure 13:
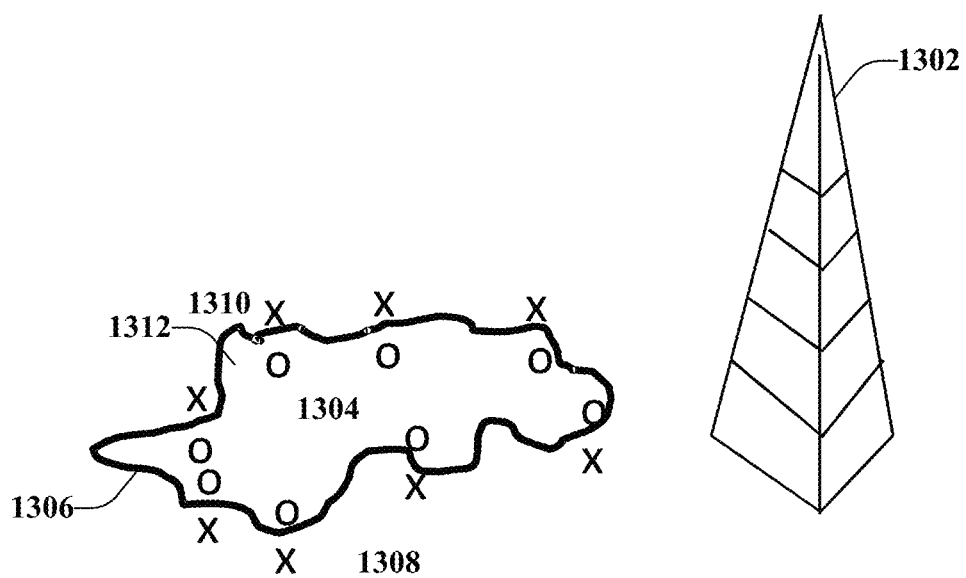
FIG. 13 illustrates boundary and points surrounding an area of interest, according to an aspect.

With the capability of communications apparatus 1100 to store and retrieve, as needed, the expected timing measurements can be retained, such as in a data store 1008, for any particular point in the geography of a base station 1302, as illustrated in FIG. 13. Estimation component 1006 can be configured to create and save a data structure 1010 of points surrounding a particular area of interest 1304 in the data store 1008. A boundary 1306 surrounding the area of interest 1304 divides the geography into at least two regions, namely, an area outside the area of interest 1308 and an area inside the area of interest 1304.

In accordance with some aspects, a data structure of measurements that fence the boundary 1306 can be created and stored. The data structure of measurements comprises a first set of measurements 1310 that are just outside the boundary 1306 and a second set of measurements 1312 that are just inside the boundary 1306. Depending on the nature of the boundary 1306 with respect to whether the boundary 1306 is smooth or jagged, a variable number of such paired boundary measurements (e.g., first set of measurements 1310 and second set of measurements 1312) may be interpolated as theoretical measurements by estimation component 1006. In accordance with some aspects, these theoretical measurements can be derived by means of interpolating the actual measurements from devices that do report actual measurements. All of the theoretical measurement points, thus, are known to be either "inside" or "outside" the boundary 1306 of interest and are, therefore, classification values having known classifications.

The theoretical measurements can be utilized as a means to train a classifier so as to classify the location of mobile device reporting actual measurements but having unknown location and/or classification. A similar classifier mechanism may be utilized to classify all mobile devices reporting measurements in the region as to whether such devices are inside or outside the region on interest.

By extension, in accordance with some aspects, data from measurements to multiple base stations can be combined to increase the precision of the classification function by means of statistically combining the classification based on multiple base station reports.

In accordance with some aspects, more than one classifier can be operational such that many different regions of interest are each classified using the same (or similar) measurement reports from the same (or similar) set of reporting devices. Thus, the classification mechanism may be flexibly used to classify devices in a particular region of latitude, longitude, and/or altitude. Further, the classification mechanism can be used to classify devices in a particularly odd-shaped region, similar to a congressional district having jagged edges that do not align with boundaries of latitude, longitude, and/or altitude.

Figure 14:
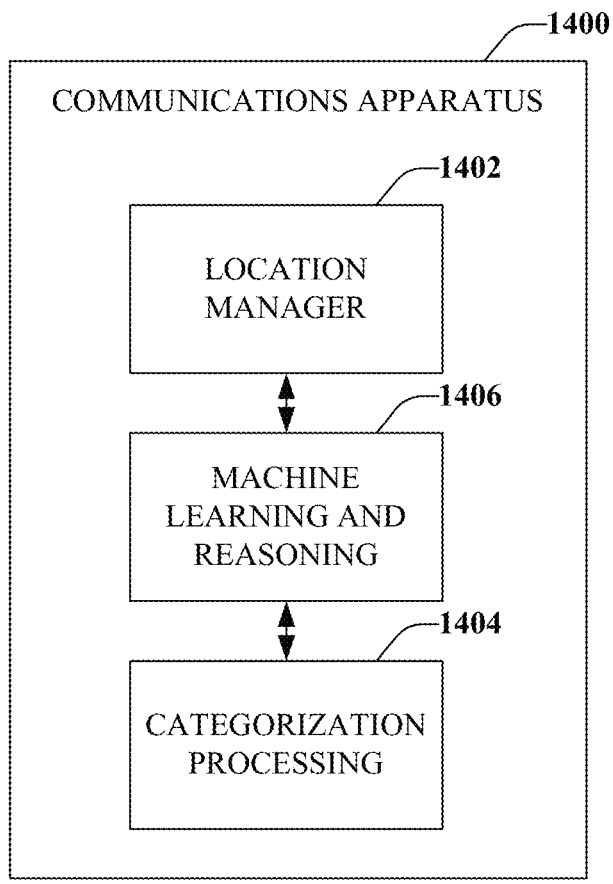
FIG. 14 illustrates a communications apparatus that employs automated learning to facilitate one or more of the disclosed aspects.

FIG. 14 illustrates a communications apparatus 1400 that employs automated learning to facilitate one or more of the disclosed aspects. Included in communications apparatus 1400 is a location manager component 1402, a categorization processing component 1404, and a machine learning and reasoning component 1406.

The machine learning and reasoning component 1406 can employ automated learning and reasoning procedures (e.g., the use of explicitly and/or implicitly trained statistical classifiers) in connection with performing inference and/or probabilistic determinations and/or statistical-based determinations as in accordance with one or more aspects as described herein. As used herein, the term "inference" refers generally to the process of reasoning about or inferring states of the system, environment, and/or mobile devices from a set of observations as captured through events, reports, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with determining a location of a mobile device, ascertaining whether a mobile device is near a point of interest, and so forth) can employ various artificial intelligence-based schemes for carrying out various aspects thereof. For example, a process for determining if a mobile device is near a point of interest can be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that should be employed to classify one or more mobile devices.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase with the location manager component 1402 and/or categorization processing component 1404. Thus, the classifier(s) can be used to automatically learn and perform a number of functions, including but not limited to ascertaining location of mobile devices, what devices to group together, how to classify a device, relationships between devices, and so forth. The criteria can include, but is not limited to, similar measurements, historical information, and so forth.

In an example, a mechanism to pre-compute a set of SVM vectors that may be used to classify the location of the mobile device has also shown to work efficiently. In this case, latitude, longitude, and altitude may be independently classified into discrete ranges of values (consistent with the maximum expected resolution). This approach is realized by using calibration data to pre-compute a linear SVM model for each range of possible values in each dimension (latitude, longitude, altitude), accounting for the maximum expected resolution in each such dimension. It should be noted that a variety of SVM kernel functions may be used to expand the number of dimensions of the problem as may be needed to effectively separate the classified measurement vectors. In either case, the linear coefficients to each of the SVM models are stored as records in a database and used to quickly classify the location of mobile device measurement reports as they arrive. It should be noted that this classification operation may be conducted in a parallel computing architecture and further need not linearly sequence through the list of all applicable SVM models. A Newton bisection approach may be readily followed to hasten the search for the mobile device location, according to some aspects. This approach can extend to classify altitude information for mobile devices also. In accordance with some aspects, a set of SVM classifications may be used to narrow the set of bins that should be further searched for a best solution.

Additionally or alternatively, an implementation scheme (e.g., rule) can be applied to classifying devices, locating devices, and so forth. It will be appreciated that the rules-based implementation can automatically and/or dynamically interpret a location based upon a predefined criterion. In response thereto, the rule-based implementation can automatically interpret and carry out functions associated with locations by employing a predefined and/or programmed rule(s) based upon any desired criteria.

Figure 15:
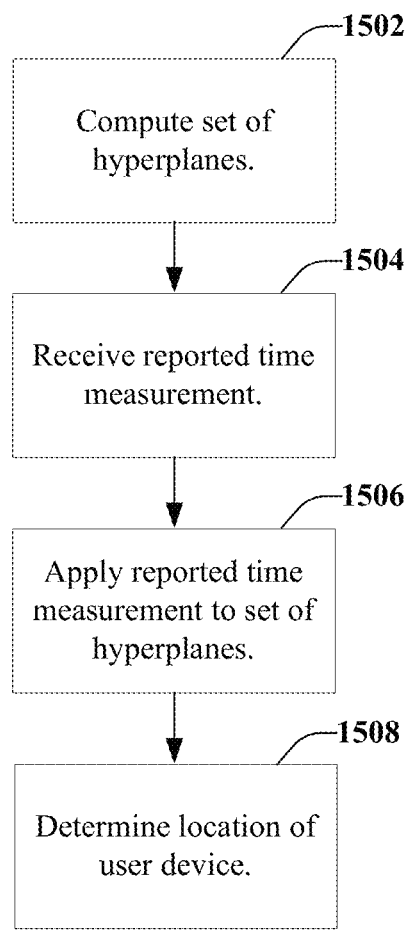
FIG. 15 illustrates a flow chart for locating a user device in a communication network, according to an aspect.

FIG. 15 illustrates a flow chart for locating a user device in a communication network, according to an aspect. At 1502, a set of hyperplanes is computing using historical data, which can include known timing measurements and associated location information. The set of hyperplanes can be retained for locating a user device in the future. The set of hyperplanes can be updated periodically based on newly arrived data and/or reconfigured data.

In accordance with some aspects, the computing can include obtaining telemetry data (e.g., at least one of a timing offset for an individual base station, measurements for a pair of base stations, indicator variables, power measurements, or combinations thereof) from a plurality of mobile devices, wherein the plurality of mobile devices are location aware devices. The telemetry data can be combined with the location information from the plurality of mobile devices and a subset of categorizing formulas can be computed based on the telemetry data and the location information.

According to some aspects, the calculating comprises solving a least squares optimization problem that positions each hyperplane between points that are closest to a hyperplane boundary. In accordance with other aspects, the computing comprises using a kernel function to map a vector of measurements received from a mobile device to a set of measurements located in a higher dimension At 1504, a reported time difference measurement is received from the user device. The user device might be a non-location aware device. However, in accordance with some aspects, the user device might be a location aware device and the accuracy of the retained set of hyperplanes can be tested.

At 1506, the reported time measurement is applied to the set of hyperplanes. For example, the applying can include classifying the reported time measurement in a sequence of one or more classification operations that provide bounds for upper and lower limits of latitude, longitude, or altitude, or combinations thereof.

In accordance with some aspects, the applying comprises receiving a collection of timing offset measures from the user device and assigning a location value to the user device, wherein the location value comprises at least one of a latitude, a longitude, and/or an altitude.

At 1508, the location of the user device is determined as a function of applying the reported time measurement to the hyperplanes. In accordance with some aspects, the determining comprises individually evaluating a latitude, a longitude, and an altitude of the user device. According to some aspects, the determining comprises employing a support vector machine to perform various functions disclosed herein.

In accordance with some aspects, the receiving comprises receiving at least one timing offset measurement from the user device and the applying comprises comparing the at least one timing offset measurement with the set of hyperplanes. In this aspect, the determining comprises determining a classification of the at least one timing offset measurement based on the comparing, wherein the classification provides an indication of the location of the user device. According to some aspects, the disclosed aspects can also include performing an error estimate for at least one hyperplane in the set of hyperplanes.

Figure 16:
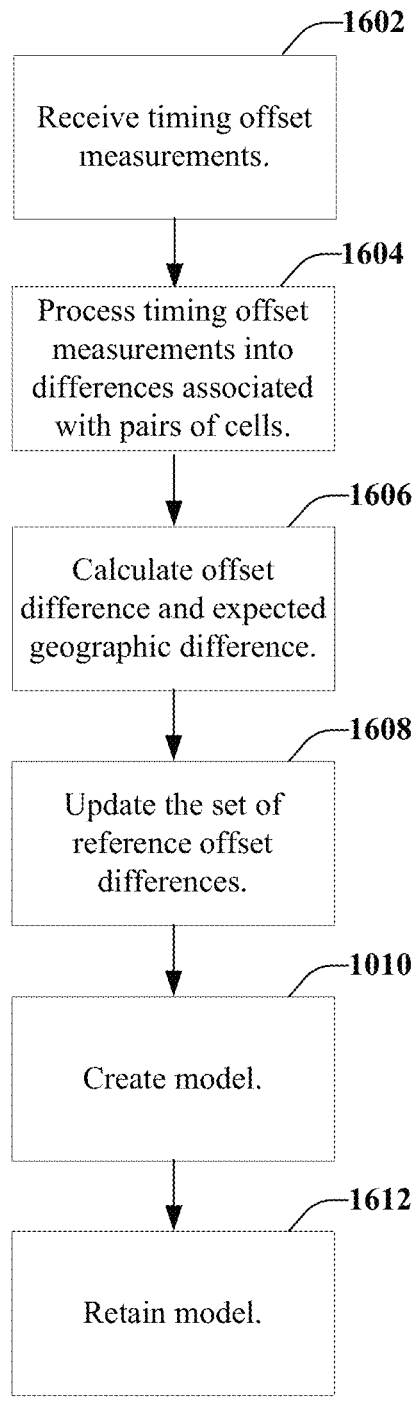
FIG. 16 illustrates a flow chart for creating or updating a location model based on received location information, according to an aspect.

FIG. 16 illustrates a flow chart for creating or updating a location model based on received location information, according to an aspect. At 1602, a collection of timing offset measures is received from a mobile device in a radio access network. At 1604, the data is optionally transformed (as discussed with reference to FIG. 5) to provide a difference calculation for each pair of base stations. For example, the collection of provided timing offset measurements associated with each CellID is processed into differences associated with each pair of CellIDs. It should be noted that, in accordance with some aspects, the data utilized for creating the hyperplanes is not based on pairs of base stations and, therefore, the transformation, at 1604, is not needed. For example, the hyperplane can be created based on timing measurements of an individual base station. In another example, the hyperplanes can be created based on indicator variables. In a further example, the hyperplane can be crated based on other values, such as absolute power measurements (e.g., how much power the mobile device is reporting), and so forth.

Since some mobile device reports are accompanied by mobile device location reports, for purposes of this flow chart, the mobile device is capable of providing (and does provide) its location information. The situation that occurs if the mobile device is not capable of providing (or does not provide) its location information will be discussed with reference to the following flow chart.

The location information provided by the mobile device is utilized to create and/or update a location model that includes calibration reference data. Thus, for each pair of CellIDs measured, at 1606, the reference offset difference and an expected geographic difference in distance to each CellID in the pair is calculated. For example, each pair of base stations (labeled with CellID) and their known location is used with the known location of the mobile device to determine reference difference offsets for each pair of base stations. At 1608, the set of reference offset differences for each pair of CellIDs is updated and retained.

For the full range of latitude, longitude, and altitude values within the scope of CellID pairs reported, at 1610, a set of SVM training vectors is ascertained and an SVM model that classifies the latitude/longitude/altitude for vectors having an unknown location is created. For example, for the full range of latitude, longitude, and altitude values of interest, a set of training vectors having a known classification above, equal to, and below each of the values of latitude, longitude, and altitude are determined. Given these training vectors having known classifications, the support vector machine hyperplanes can be calculated. These hyperplanes can be defined by a set of coefficients (e.g., SVM model coefficients for each SVM model). In accordance with some aspects, the hyperplane can be calculated using one of several alternative kernel functions and solved using a least squares solution, which is well known to those of skill in the art and so will not be further described here.

The hyperplanes are saved, at 1612 for subsequent use. The model coefficients can be utilized to classify a mobile device, wherein the classification indicates whether the mobile device is above or below each value of latitude, longitude, and/or altitude of interest.

The flow chart ends for mobile devices whose location is accurately reported. However, in accordance with some aspects, an error estimate can be calculated by proceeding with the following flow chart, even though the location is already known by a timely GPS report. However, executing the following flow chart can provide an estimate of the location that may be readily compared to the reported GPS location, thereby providing an estimate of the error, if any. This error calculation can be performed for all devices, or a subset thereof, that report their location so as to provide statistics on the likely error of all calculations.

Figure 17:
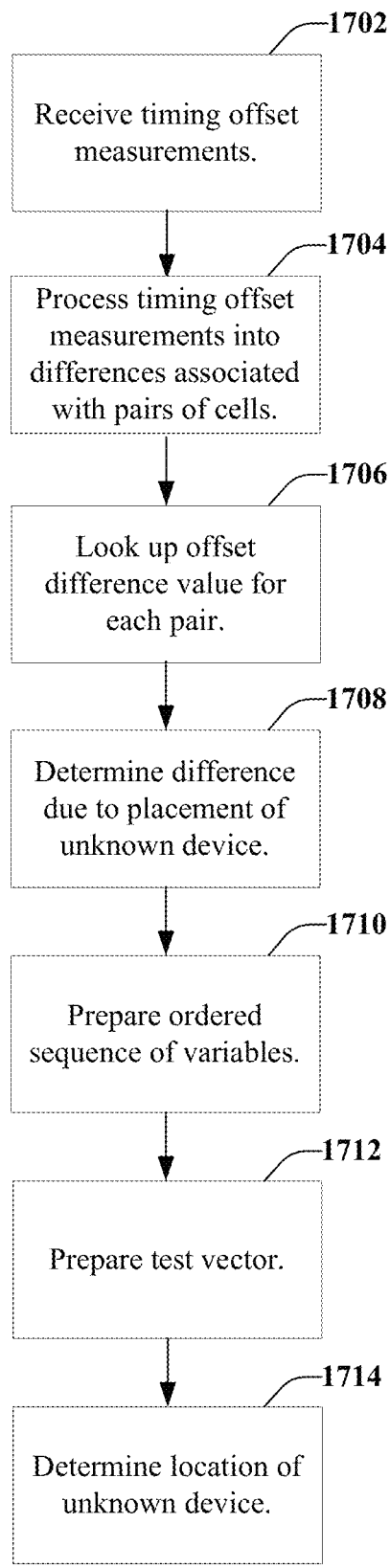
FIG. 17 illustrates a flow chart for locating a non-location aware mobile device, according to an aspect.

FIG. 17 illustrates a flow chart for locating a non-location aware mobile device, according to an aspect. At 1702, a collection of timing offset measures is received from a mobile device in a radio access network. At 1704, the data is optionally transformed (as discussed with reference to FIG. 5) to provide a difference calculation for each pair of base stations. For example, the collection of provided timing offset measurements associated with each CellID is processed into differences associated with each pair of CellIDs. It should be noted that, in accordance with some aspects, the data utilized for creating the hyperplanes is not based on pairs of base stations and, therefore, the transformation, at 1704, is not needed, as discussed with reference to the above figure. The following will describe the situation when a mobile device is not capable of providing (or does not provide) its location information and/or if accuracy of calculations is to be evaluated.

At 1706, for each pair of CellIDs in the reported set, an offset difference value for the pair is retrieved. For each CellID pair, at 1708, the reference value is subtracted from the actual measured difference value to determine the difference due to geographical placement of the unknown mobile device. Thus, the reported timing differences are adjusted to values that factor out the base station synchronization differences.

Using the reference data prepared, at 1708, a vector is prepared, at 1710. The vector consists of an ordered sequence of variable values, which include indicator variables that describe whether or not certain pairs of base stations are reporting data. For example, the prepared ordered sequence of variables can include the geographic difference value for each pair, together with an indicator variable for each included pair.

At 1712, a set of stored SVM classifiers is used with the calculated vector. The vector of the ordered sequences of variables can be used as a test vector together with each SVM model that classifies vectors having an unknown location. At 1714, the latitude, longitude, and altitude of the mobile device are ascertained by aggregating the classifications determined, at 1712.

Figure 18:
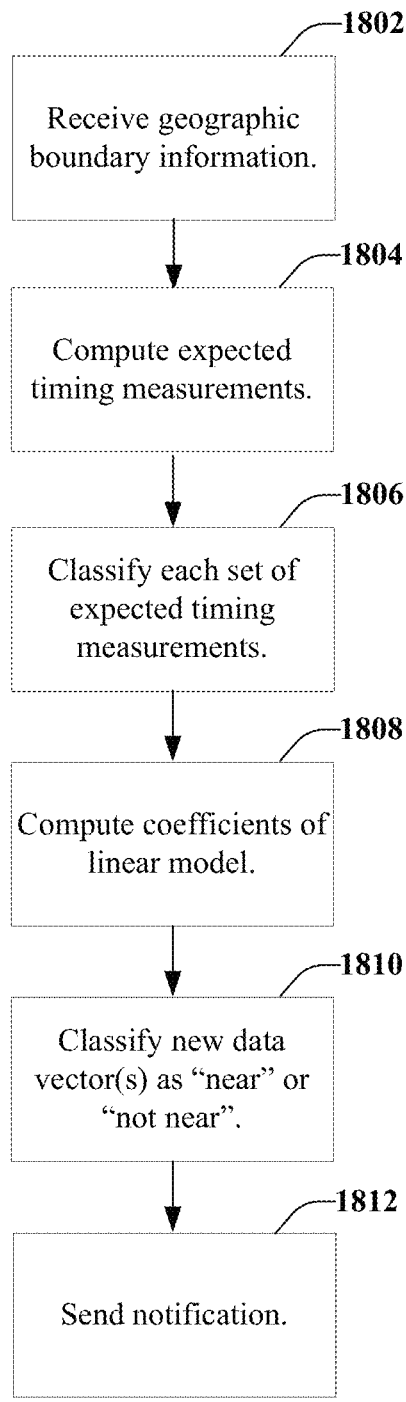
FIG. 18 illustrates a flow chart for classifying mobile devices as a function of a nearness of the mobile device to a point of interest, according to an aspect.

FIG. 18 illustrates a flow chart for classifying mobile devices as a function of a the nearness of the mobile device to a point of interest, according to an aspect. At 1802, information related to a geographical boundary is received. In accordance with some aspects, the geographical boundary can be arbitrary (e.g., non-uniform, non-concentric, and so forth). The geographical boundary can be defined by a provisioning operator, according to an aspect. Further, one or more geographical boundaries that define "near" and "not near" in the context of a known point of interest on a map, for example, can be identified based on the received boundary information.

At 1804, the geographical boundary is examined and expected timing differences at geographical points on each side of the given boundary are computed. Thus, the geographical boundary is examined to determine the set of cell tower timing measurements that are expected both within the boundary and just outside the boundary. These measurements are timing measurement differences from pairs of cell towers serving the boundary area.

At 1806, each set of expected timing measurements from all pairs of cell towers in the region are each individually categorizing as "near" and "not near". A training data set is derived from the individual categorizations such that the training data set that brackets the boundary on all sides is computed. The training data set can be stored for later retrieval.

At 1808, coefficients of a liner model can be computed. The coefficients can be computed as a function of the input vectors. In accordance with some aspects, the computation can be performed by applying a SVM algorithm to the training data. At 1810, any new data vector received is classified as "near" and "not near" as a function of the coefficients. It should be noted that the classification, at 1810, skips the intermediate step of calculating geographic coordinates (e.g., latitude, longitude) and can be readily extended to including altitude as a property of "near" and "not near".

Optionally, at 1812, a notification is sent as a function of whether the device is "near" or "not near" the point of interest. For example, if the model classifier detects a timing measurement vector for which the SVM coefficients produce a positive classification of "near", a message can be sent to a "notification distributor" to distribute this new information to subscribed applications, either on the mobile device itself or in some other location.

Figure 19:
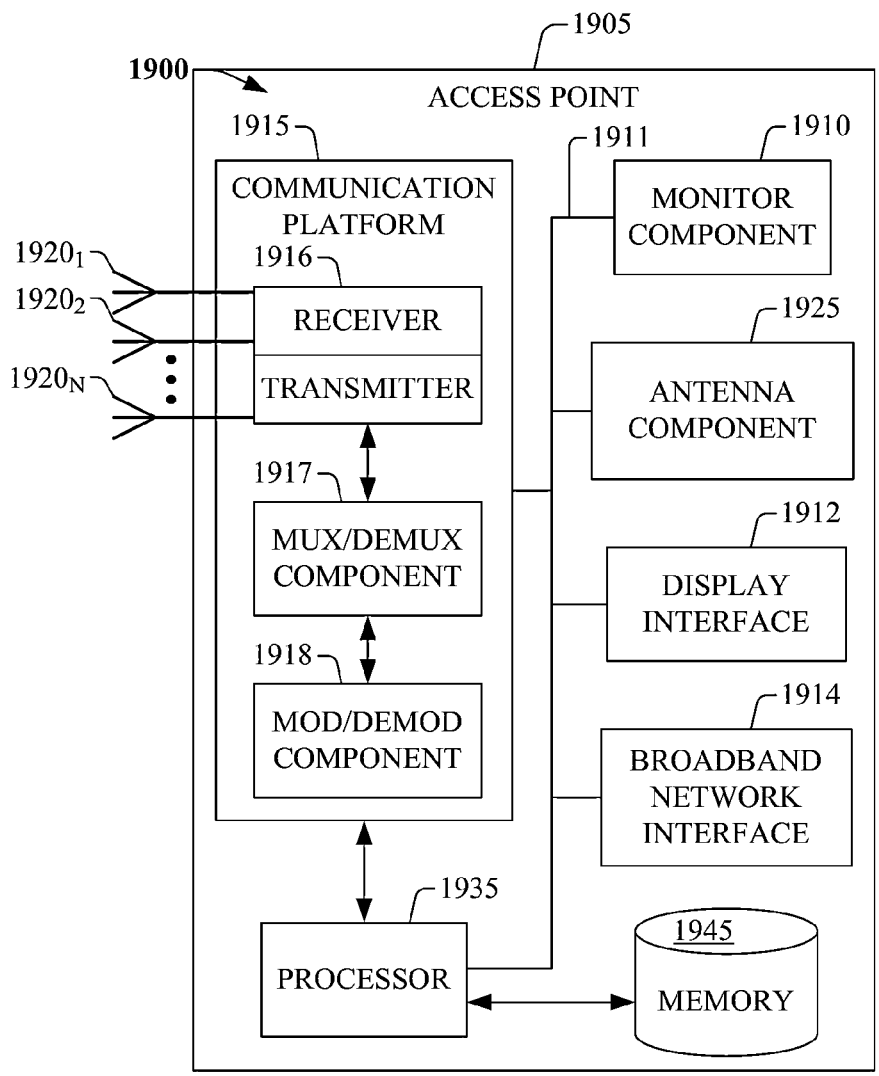
FIG. 19 illustrates a block diagram of an access point, in accordance with an embodiment.

To provide further context for various aspects of the disclosed subject matter, FIG. 19 illustrates a block diagram of an embodiment 1900 of an access point 1905, e.g., base station, wireless access point, femtocell access point, etc. that can enable and/or exploit features or aspects of the disclosed subject matter.

In embodiment 1900, access point 1905 can receive and transmit signal(s) from and to wireless devices, wireless ports, wireless routers, etc. through segments $\mathbf{1920_1}$-$\mathbf{1920_N}$ (N is a positive integer). Segments $\mathbf{1920_1}$-$\mathbf{1920_N}$ can be internal and/or external to access point 1905, and can be controlled by (1) monitor component 1910 and (2) antenna component 1925. Further, monitor component 1910 and antenna component 1925 can couple to communication platform 1915, which comprises electronic components and associated circuitry that provide for processing and manipulation of received signal(s) and other signal(s) to be transmitted.

In an aspect, communication platform 1915 includes a receiver/transmitter 1916 that can convert analog signals to digital signals upon reception of the analog signals, and convert digital signals to analog signals upon transmission. In addition, receiver/transmitter 1916 can divide a single data stream into multiple, parallel data streams, or perform the reciprocal operation. Coupled to receiver/transmitter 1916 is a multiplexer/demultiplexer 1917 that facilitates manipulation of signals in time and frequency space. Electronic component 1917 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1917 can scramble and spread information, e.g., codes, according to substantially any code known in the art, e.g., Hadamard-Walsh codes, Baker codes, Kasami codes, polyphase codes, etc. A modulator/demodulator 1918 is also a part of communication platform 1915, and can modulate information according to multiple modulation techniques, such as frequency modulation, amplitude modulation, e.g., M-ary quadrature amplitude modulation (QAM), with M a positive integer); phase-shift keying (PSK); etc.

Access point 1905 also includes a processor 1935 configured to confer, at least in part, functionality to substantially any electronic component in access point 1905. In particular, processor 1935 can facilitate configuration of access point 1905 via, e.g., monitor component 1910, antenna component 1925, and one or more component therein. Additionally, access point 1905 can include display interface 1912, which can display functions that control functionality of access point 1905, or reveal operation conditions thereof. In addition, display interface 1912 can include a screen to convey information to an end user. In an aspect, display interface

1912 can be an LCD (Liquid Crystal Display), a plasma panel, a monolithic thin-film based electrochromic display, and so on. Moreover, display interface 1912 can also include a component (e.g., speaker) that facilitates communication of aural indicia, which can also be employed in connection with messages that convey operational instructions to an end user. Display interface 1912 can also facilitate data entry e.g., through a linked keypad or via touch gestures, which can cause access point 1905 to receive external commands, e.g., restart operation.

Broadband network interface 1914 facilitates connection of access point 1905 to a service provider network (not shown) that can comprise one or more cellular technologies (e.g., 3GPP UMTS, GSM, etc.) via backhaul link(s) (not shown), which enable incoming and outgoing data flow. Broadband network interface 1914 can be internal or external to access point 1905, and can utilize display interface 1912 for end-user interaction and status information delivery.

Processor 1935 can be functionally connected to communication platform 1915 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1935 can be functionally connected, via data, system, or address bus 1911, to display interface 1912 and broadband network interface 1914, to confer, at least in part, functionality to each of such components.

In access point 1905, memory 1945 can retain location and/or coverage area, e.g., macro sector, identifier(s); access list(s) that authorize access to wireless coverage through access point 1905; sector intelligence that can include ranking of coverage areas in the wireless environment of access point 1905, radio link quality and strength associated therewith, or the like. Memory 1945 also can store data structures, code instructions and program modules, system or device information, code sequences for scrambling, spreading and pilot transmission, access point configuration, and so on. Processor 1935 can be coupled, e.g., via a memory bus, to memory 1945 in order to store and retrieve information used to operate and/or confer functionality to the components, platform, and interface that reside within access point 1905.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1945, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 20:
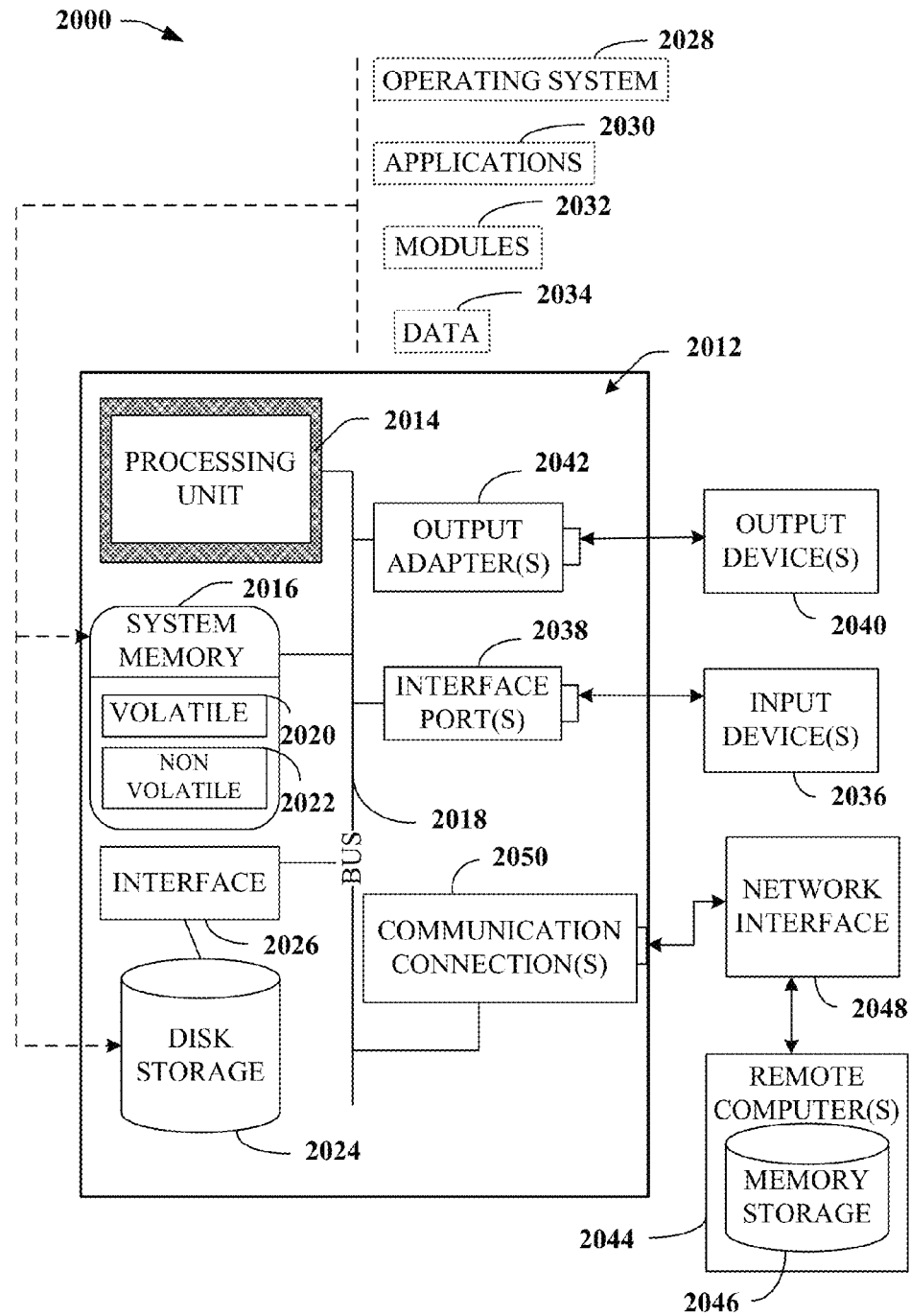
FIG. 20 illustrates a block diagram of a computing system, in accordance with an embodiment.

In order to provide a context for the various aspects of the disclosed subject matter, FIG. 20, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 20, a block diagram of a computing system 2000 operable to execute the disclosed systems and methods is illustrated, in accordance with an embodiment. Computer 2012 includes a processing unit 2014, a system memory 2016, and a system bus 2018. System bus 2018 couples system components including, but not limited to, system memory 2016 to processing unit 2014. Processing unit 2014 can be any of various available processors. Dual microprocessors and other multiprocessor architectures also can be employed as processing unit 2014.

System bus 2018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 2016 includes volatile memory 2020 and nonvolatile memory 2022. A basic input/output system (BIOS), containing routines to transfer information between elements within computer 2012, such as during start-up, can be stored in nonvolatile memory 2022. By way of illustration, and not limitation, nonvolatile memory 2022 can include ROM, PROM, EPROM, EEPROM, or flash memory. Volatile memory 2020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2012 also includes removable/non-removable, volatile/non-volatile computer storage media. FIG. 20 illustrates, for example, disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to system bus 2018, a removable or non-removable interface is typically used, such as interface 2026.

It is to be appreciated that FIG. 20 describes software that acts as an intermediary between users and computer resources described in suitable operating environment 2000. Such software includes an operating system 2028. Operating system 2028, which can be stored on disk storage 2024, acts to control and allocate resources of computer system 2012. System applications 2030 take advantage of the management of resources by operating system 2028 through program modules 2032 and program data 2034 stored either in system memory 2016 or on disk storage 2024. It is to be appreciated that the disclosed subject matter can be implemented with various operating systems or combinations of operating systems.

A user can enter commands or information, e.g., via interface component 2026, into computer system 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2014 through system bus 2018 via interface port(s) 2038. Interface port(s) 2038 include, for example, a serial port, a parallel port, a game port, and a universal serial bus (USB). Output device(s) 2040 use some of the same type of ports as input device(s) 2036.

Thus, for example, a USB port can be used to provide input to computer 2012 and to output information from computer 2012 to an output device 2040. Output adapter 2042 is provided to illustrate that there are some output devices 2040 like monitors, speakers, and printers, among other output devices 2040, which use special adapters. Output adapters 2042 include, by way of illustration and not limitation, video and sound cards that provide means of connection between output device 2040 and system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. Remote computer(s) 2044 can be a personal computer, a server, a router, a network PC, a workstation, a microprocessor based appliance, a peer device, or other common network node and the like, and typically includes many or all of the elements described relative to computer 2012.

For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refer(s) to hardware/software employed to connect network interface 2048 to bus 2018. While communication connection 2050 is shown for illustrative clarity inside computer 2012, it can also be external to computer 2012. The hardware/software for connection to network interface 2048 can include, for example, internal and external technologies such as modems, including regular telephone grade modems, cable modems and DSL modems, ISDN adapters, and Ethernet cards.

It is to be noted that aspects, features, or advantages of the subject innovation described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the subject innovation. It is, of course, not possible to describe every conceivable combination of components or methods for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method comprising:
 determining, by a system including a processor, a set of separating hyperplanes using historical data of known timing measurements and associated location information received from a plurality of location aware mobile devices;

receiving, by the system, a reported time measurement from a non-location aware device, wherein location information is not received from the non-location aware device;

applying, by the system, the reported time measurement from the non-location aware device to the set of separating hyperplanes, wherein the set of separating hyperplanes divides a field of interest into ranges of geographic coordinates; and determining, by the system, a location of the non-location aware device as a function of the applying;

wherein the applying comprises:

receiving a collection of timing offset measures from the non-location aware device; and assigning a location value to the non-location aware device, wherein the location value comprises location information representative of a location with respect to a geographic coordinate.

2. The method of claim 1, wherein the determining the set of separating hyperplanes comprises:

receiving telemetry data from the plurality of location aware mobile devices; and determining a set of categorizing formulas based on the telemetry data and the associated location information.

3. The method of claim 1, wherein the applying comprises comparing the timing offset measurement with the set of separating hyperplanes, the determining the location comprises determining a classification of the one timing offset measurement based on the comparing, and the classification provides an indication of the location of the non-location aware device.

4. The method of claim 1, further comprising:

retaining, by the system, the set of separating hyperplanes; and updating, by the system, the set of separating hyperplanes based on satisfaction of a defined condition.

5. The method of claim 1, wherein the determining the location comprises determining a least squares solution that positions a separating hyperplane of the set of separating hyperplanes between points that are in defined proximity to a boundary of the separating hyperplane.

6. The method of claim 1, wherein the applying comprises classifying the reported time measurement according to a classification operation that provides respective bounds for upper and lower limits of latitude, longitude, and altitude.

7. The method of claim 1, wherein the determining the location comprises evaluating a latitude, a longitude, and an altitude of the non-location aware device.

8. The method of claim 1, wherein the determining the set of separating hyperplanes comprises mapping, based on a kernel function, a set of measurements received from a location aware mobile device of the plurality of location aware mobile devices to a set of measurements of a higher dimension.

9. The method of claim 1, further comprising estimating, by the system, an error for a separating hyperplane in the set of separating hyperplanes.

10. The method of claim 1, wherein the determining the location comprises:

classifying time differences of the known timing measurements; and determining the location of the non-location aware device is within a defined proximity of a point of interest based on the classifying.

11. The method of claim 1, wherein the set of separating hyperplanes divides the field of interest into the ranges of geographic coordinates as a function of timing measurement differences for pairs of base station devices in the field of interest.

12. A system, comprising:

a memory to store computer-executable instructions; and a processor, communicatively coupled to the memory, that facilitates execution of the computer-executable instructions to perform operations, comprising:

identifying a set of separating hyperplanes using historical data of known timing measurements and associated location information received from a plurality of location aware mobile devices;

receiving a reported time measurement from a non-location aware device, wherein location information is not received from the non-location aware device:

applying the reported time measurement from the non-location aware device to the set of separating hyperplanes;

determining a location of the non-location aware device as a function of the reported time measurement being applied;

receiving a set of timing offset measurements from the non-location aware device; and assigning an altitude to the non-location aware device.

13. The system of claim 12, wherein the operations further comprise:

receiving power measurements from the plurality of location aware mobile devices; and calculating a set of categorizing formulas as a function of the timing offset measurements and the power measurements.

14. The system of claim 12, wherein the operations further comprise solving a least squares optimization equation based on a positioning of a separating hyperplane of the set of separating hyperplanes between points that are determined to be near a boundary of the separating hyperplane.

15. The system of claim 12, wherein the operations further comprise determining an error for a hyperplane in the set of separating hyperplanes.

16. A tangible computer-readable medium storing computer-executable instructions that, in response to execution, cause a system including a processor to perform operations, comprising:

creating a set of hyperplanes based on historical timing measurements and location information received from a plurality of location aware devices;

receiving, from a non-location aware device, a time measurement, wherein location information is not received from the non-location aware device;

determining a location of the non-location aware device based on a comparison of the time measurement to the set of hyperplanes, wherein the set of hyperplanes divides a field of interest into ranges of geographic coordinates as a function of timing measurement differences for pairs of base station devices in the field of interest;

receiving a set of timing offset measurements from the non-location aware device; and assigning an altitude to the non-location aware device.

17. The tangible computer-readable medium of claim 16, wherein the operations further comprise:

combining telemetry data received from the plurality of location aware devices with the location information; and computing a set of categorizing formulas based on the telemetry data and the location information.

18. The non-transitory tangible computer-readable medium of claim 16, wherein the operations further comprise:
  evaluating a latitude, a longitude, and an altitude of the non-location aware device; and
  transmitting the latitude, the longitude and the altitude to another computing device.

\* \* \* \* \*